US010716013B2

(12) United States Patent
Malik et al.

(10) Patent No.: US 10,716,013 B2
(45) Date of Patent: Jul. 14, 2020

(54) BEAM REFINEMENT FOR MILLIMETER WAVE (MMW) SYSTEM

(71) Applicant: QUALCOMM Incorporated, San Diego, CA (US)

(72) Inventors: Rahul Malik, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 15/909,856

(22) Filed: Mar. 1, 2018

(65) Prior Publication Data
US 2018/0279134 A1    Sep. 27, 2018

Related U.S. Application Data

(60) Provisional application No. 62/476,542, filed on Mar. 24, 2017.

(51) Int. Cl.
| | |
|---|---|
| *H04W 16/28* | (2009.01) |
| *H04L 5/00* | (2006.01) |
| *H04B 7/06* | (2006.01) |
| *H04W 72/04* | (2009.01) |

(52) U.S. Cl.
CPC ............ *H04W 16/28* (2013.01); *H04B 7/063* (2013.01); *H04B 7/0695* (2013.01); *H04L 5/0048* (2013.01); *H04L 5/001* (2013.01); *H04L 5/0023* (2013.01); *H04W 72/046* (2013.01)

(58) Field of Classification Search
CPC .... H04W 16/28; H04W 72/046; H04B 7/063; H04B 7/0695; H04L 5/00; H04L 5/0048
See application file for complete search history.

(56) References Cited

U.S. PATENT DOCUMENTS

| | | | |
|---|---|---|---|
| 2009/0210474 A1* | 8/2009 | Shao | H04L 12/1877 709/201 |
| 2013/0039401 A1 | 2/2013 | Han et al. | |
| 2013/0286960 A1 | 10/2013 | Li et al. | |
| 2015/0009951 A1 | 1/2015 | Josiam et al. | |
| 2016/0192208 A1 | 6/2016 | Zierdt et al. | |
| 2016/0301466 A1 | 10/2016 | Kinamon et al. | |
| 2016/0344463 A1 | 11/2016 | Kim et al. | |

OTHER PUBLICATIONS

International Search Report and Written Opinion—PCT/US2018/020709—ISA/EPO—dated Jun. 11, 2018 (172747WO).

\* cited by examiner

*Primary Examiner* — Walter J Divito
(74) *Attorney, Agent, or Firm* — Holland & Hart LLP

(57) ABSTRACT

Methods, systems, and devices for wireless communication are described for transmitting a first signal corresponding to a symbol so as to cover a geographic sector with via analog beamforming, transmitting, using analog beamforming and a second port, a second signal corresponding to the symbol, wherein aspects of the symbol are phase modulated with respect to the first signal such that corresponding aspects of a combined signal are beam-formed in one or more directions that at least partially overlap the geographic sector, a receiver receives the combined signal and from it determines a preferred refined beam for subsequent transmissions and transmits an indicator that includes the preferred refined beam, and the transmitter receives an indication from a receiver identifying one or more aspects of the combined signal, and determining a refined beam for subsequent transmissions based at least in part on the indication.

30 Claims, 24 Drawing Sheets

Legend 1045     1050

BEAM REFINEMENT FOR MILLIMETER WAVE (MMW) SYSTEM

CROSS REFERENCES

The present Application for Patent claims priority to U.S. Provisional Patent Application No. 62/476,542 by Malik et al., entitled "Beam Refinement For Millimeter Wave (mmW) System," filed Mar. 24, 2017, assigned to the assignee hereof.

BACKGROUND

The following relates generally to wireless communication, and more specifically to beam refinement for millimeter wave (mmW) systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In a mmW system, a base station and a UE may communicate via one or more directional beams. A transmitter (e.g. a base station) may engage in a beam sweeping operating to establish an active beam pair with a receiver (e.g., a UE). An active beam pair may include an active transmit beam of the transmitter and a corresponding active receive beam of the receiver. The transmit beams and the receive beams in an active beam pair may be refined through, for example, beam refinement procedures. However, such beam refinement procedures may require multiple transmissions that each include multiple training symbols. Thus, the UE may remain in an awake mode expending power receiving and/or transmitting the multiple beam refinement transmissions, and the base station and UE may unnecessarily utilize resources during the refinement process, resulting in less than optimal efficiency.

SUMMARY

The described techniques relate to improved methods, systems, devices, or apparatuses that support beam refinement for millimeter wave (mmW) systems. Generally, the described techniques provide for transmitting a first transmission, including a beam refinement symbol, via a first port, and a second transmission, including a phase shifted beam refinement symbol, via a second port such that the first transmission and the second transmission result in a combined signal with directional dependent frequency selectivity. The first transmission may be an analog beam-formed transmission which is oriented to cover a geographic sector. The second transmission may include a beam refinement symbol that is modulated (e.g., phase modulated or amplitude modulated) with respect to the first transmission such that the second transmission is beam-formed in one or more directions that at least partially overlap the geographic sector. In some cases, the first and second transmissions may be OFDM symbols, and phase-modulating different tones of the second transmission may generate a combined signal that carries a plurality of tone beams, each one corresponding to a tone and a spatial direction.

The described techniques may further provide receiving, at a receiver, the combined signal that carries a plurality of tone beams. The receiver may measure the gain of the tone beams carried in the combined signal with respect to known values or a reference combined signal, and may identify a preferred refined beam for receiving subsequent transmissions. The receiver may transmit an indication of the determined preferred refined beam to the transmitter. Such techniques may reduce the time needed for beam refinement in a wireless communications system.

A method of for wireless communication is described. The method may include transmitting, using beamforming and a first port, a first signal corresponding to a symbol so as to cover a geographic sector, transmitting, using beamforming and a second port, a second signal corresponding to the symbol, wherein aspects of the symbol are additionally modulated during the transmitting of the second signal with respect to the transmitting of the first signal such that corresponding aspects of a combined signal of the first signal and second signal are beam-formed in one or more directions that at least partially overlap the geographic sector, receiving an indication from a receiver identifying one or more of the aspects of the combined signal, wherein the indication is based at least in part on measurements of the one or more of the aspects of the combined signal, and determining a refined beam for subsequent transmissions based at least in part on the indication.

An apparatus for wireless communication is described. The apparatus may include means for transmitting, using beamforming and a first port, a first signal corresponding to a symbol so as to cover a geographic sector, means for transmitting, using beamforming and a second port, a second signal corresponding to the symbol, wherein aspects of the symbol are additionally modulated during the transmitting of the second signal with respect to the transmitting of the first signal such that corresponding aspects of a combined signal of the first signal and second signal are beam-formed in one or more directions that at least partially overlap the geographic sector, means for receiving an indication from a receiver identifying one or more of the aspects of the combined signal, wherein the indication is based at least in part on measurements of the one or more of the aspects of the combined signal, and means for determining a refined beam for subsequent transmissions based at least in part on the indication.

Another apparatus for wireless communication is described. The apparatus may include a processor, memory in electronic communication with the processor, and instructions stored in the memory. The instructions may be operable to cause the processor to transmit, using beamforming and a first port, a first signal corresponding to a symbol so as to cover a geographic sector, transmit, using beamforming and a second port, a second signal corresponding to the symbol, wherein aspects of the symbol are additionally modulated during the transmitting of the second signal with respect to the transmitting of the first signal such that corresponding aspects of a combined signal of the first signal and second signal are beam-formed in one or more directions that at least partially overlap the geographic sector, receive an indication from a receiver identifying one or more of the aspects of the combined signal, wherein the indication is based at least in part on measurements of the one or more of the aspects of the combined signal, and determine a refined beam for subsequent transmissions based at least in part on the indication.

A non-transitory computer readable medium for wireless communication is described. The non-transitory computer-readable medium may include instructions operable to cause a processor to transmit, using beamforming and a first port, a first signal corresponding to a symbol so as to cover a geographic sector, transmit, using beamforming and a second port, a second signal corresponding to the symbol, wherein aspects of the symbol are additionally modulated during the transmitting of the second signal with respect to the transmitting of the first signal such that corresponding aspects of a combined signal of the first signal and second signal are beam-formed in one or more directions that at least partially overlap the geographic sector, receive an indication from a receiver identifying one or more of the aspects of the combined signal, wherein the indication is based at least in part on measurements of the one or more of the aspects of the combined signal, and determine a refined beam for subsequent transmissions based at least in part on the indication.

In some examples of the method, apparatus, and non-transitory computer-readable medium described above, the symbol may be at least a portion of a reference symbol, at least a portion of a control symbol, or at least a portion of a data symbol.

Some examples of the method, apparatus, and non-transitory computer-readable medium described above may further include processes, features, means, or instructions for transmitting a reference combined signal corresponding to a first time instance that includes a reference modulation applied to the second signal transmitted by the second port, with respect to the first signal transmitted by the first port. Some examples of the method, apparatus, and non-transitory computer-readable medium described above may further include processes, features, means, or instructions for transmitting the combined signal corresponding to a second time instance, wherein aspects of the combined signal transmitted in the second time instance includes aspects that may be beam-formed in one or more directions.

In some examples of the method, apparatus, and non-transitory computer-readable medium described above, the indication may be further based on measurements of the one or more of the aspects of the combined signal in reference to corresponding aspects of the reference combined signal. In some examples, the aspects of the combined signal comprise the relative amplitude of a subset of tones of the combined signal. In some examples, the aspects of the combined signal comprise the relative phase of a subset of tones of the combined signal.

Some examples of the method, apparatus, and non-transitory computer-readable medium described above may further include processes, features, means, or instructions for phase-modulating different tones of the second signal such that the combined signal includes a plurality of tone beams each corresponding to one of the one or more directions. Some examples of the method, apparatus, and non-transitory computer-readable medium described above may further include processes, features, means, or instructions for amplitude modulating different tones of the second signal such that the combined signal includes a plurality of tone beams each corresponding to one of the one or more directions.

Some examples of the method, apparatus, and non-transitory computer-readable medium described above may further include processes, features, means, or instructions for transmitting the combined signal via a single antenna panel that includes the first port and the second port. In some examples, a sub-array of the second port may be in-line with a sub-array of the first port. Some examples may further include processes, features, means, or instructions for directing a component of the combined signal in a direction of interest with respect to the single antenna panel.

Some examples of the method, apparatus, and non-transitory computer-readable medium described above may further include processes, features, means, or instructions for processing the symbol of the first signal using at least a portion of a first transmit chain. Some examples may further include processes, features, means, or instructions for processing the symbol of the second signal using at least a portion of a second transmit chain. Some examples may further include processes, features, means, or instructions for transmitting the combined signal via a first antenna panel using at least portions of the first transmit chain and the second transmit chain.

Some examples of the method, apparatus, and non-transitory computer-readable medium described above may further include processes, features, means, or instructions for directing the symbol of the second signal to the first antenna panel via a switching matrix. Some examples may further include processes, features, means, or instructions for directing the symbol of the second signal to the first antenna panel by multiplexing the symbol of the second signal with the symbol of the first signal into a single stream directed to the first antenna panel. Some examples may further include processes, features, means, or instructions for transmitting subsequent signals using the refined beam via multi-layer transmissions using both the first antenna panel and the second antenna panel.

Some examples of the method, apparatus, and non-transitory computer-readable medium described above may further include processes, features, means, or instructions for grouping the tone beams so that more than one tone beam corresponds to one of the one or more directions. Some examples may further include processes, features, means, or instructions for frequency interleaving the tone beams of a same group. Some examples of the method, apparatus, and non-transitory computer-readable medium described above may further include processes, features, means, or instructions for blocking interleaving the tone beams of a same group.

Some examples of the method, apparatus, and non-transitory computer-readable medium described above may further include processes, features, means, or instructions for repeating transmission of the first and second signals resulting in a second combined signal, wherein aspects of the second combined signal may be beam-formed in one or more directions that at least partially overlap with a second geographic sector. Some examples of the method, apparatus, and non-transitory computer-readable medium described above may further include processes, features, means, or instructions for receiving a second indication from the receiver identifying one or more aspects of the second combined signal, wherein the second indication may be based at least in part on measurements of the one or more of the aspects of the second combined signal. Some examples of the method, apparatus, and non-transitory computer-readable medium described above may further include processes, features, means, or instructions for determining a refined beam for subsequent transmissions based at least in part on the first indication and the second indication.

Some examples of the method, apparatus, and non-transitory computer-readable medium described above may further include processes, features, means, or instructions for transmitting, in additional signals, the symbol via additional ports, the additional signals being modulated with respect to the first signal such that the additional signals may be digitally beam-formed in additional directions that at least partially overlap the geographic sector.

Some examples of the method, apparatus, and non-transitory computer-readable medium described above may further include processes, features, means, or instructions for beam-forming the refined beam by rotating an analog-formed beam based at least in part on the indication. Some examples may further include processes, features, means, or instructions for beam-forming the refined beam by using digital or analog beam-forming, or combinations thereof, to increase a transmitted gain in a direction of the receiver.

In some examples of the method, apparatus, and non-transitory computer-readable medium described above, the indication comprises either a direction to be used by the refined beam or a beam index corresponding to the direction to be used by the refined beam. In some examples, the beam index may be defined through either a predetermined table or via a prior message exchange with the receiver. In some examples, the indication comprises the measurements of the gain of the combined signal.

In some examples of the method, apparatus, and non-transitory computer-readable medium described above, the symbol of the combined signal may be included in either the preamble, middle, or tail of respective transmission packets. In some examples, the combined signal may be located in different frequency bands. Some examples may further include processes, features, means, or instructions for including a sector identification, a network identification, a panel identification, or combinations thereof, in one or both of the first signal and the second signal. In some examples, the combined signal may be associated with one or more synchronization signals or one or more reference signals of the sector sweep phase.

Some examples of the method, apparatus, and non-transitory computer-readable medium described above may further include processes, features, means, or instructions for transmitting the combined signal during a sector sweep phase. Some examples may further include processes, features, means, or instructions for receiving the indication as part of feedback received from the receiver. In some examples, the feedback received from the receiver may be in the form of an association beamforming training (ABFT) signal, a responder transmit sector sweep (R-TXSS) signal, or a random access channel (RACH) signal. Some examples may further include processes, features, means, or instructions for transmitting the combined signal in response to a request from the receiver for beam refinement.

A method of for wireless communication is described. The method may include transmitting, using beamforming and a first port, a first signal corresponding to a symbol so as to cover a geographic sector, transmitting, using beam-forming and a second port, a second signal corresponding to the symbol, wherein aspects of the symbol are additionally modulated during the transmitting of the second signal with respect to the transmitting of the first signal such that corresponding aspects of a combined signal of the first signal and second signal are beam-formed in one or more directions that at least partially overlap the geographic sector, and the combined signal is retransmitted at different times such that each transmission of the combined signal at different times corresponds to the one of the one or more directions, receiving an indication from a receiver identifying one or more of the aspects of the combined signal, wherein the indication is based at least in part on measurements of the one or more of the aspects of the second signal, and determining a refined beam for subsequent transmissions based at least in part on the indication.

An apparatus for wireless communication is described. The apparatus may include means for transmitting, using beamforming and a first port, a first signal corresponding to a symbol so as to cover a geographic sector, means for transmitting, using beamforming and a second port, a second signal corresponding to the symbol, wherein aspects of the symbol are additionally modulated during the transmitting of the second signal with respect to the transmitting of the first signal such that corresponding aspects of a combined signal of the first signal and second signal are beam-formed in one or more directions that at least partially overlap the geographic sector, and the combined signal is retransmitted at different times such that each transmission of the combined signal at different times corresponds to the one of the one or more directions, means for receiving an indication from a receiver identifying one or more of the aspects of the combined signal, wherein the indication is based at least in part on measurements of the one or more of the aspects of the second signal, and means for determining a refined beam for subsequent transmissions based at least in part on the indication.

Another apparatus for wireless communication is described. The apparatus may include a processor, memory in electronic communication with the processor, and instructions stored in the memory. The instructions may be operable to cause the processor to transmit, using beamforming and a first port, a first signal corresponding to a symbol so as to cover a geographic sector, transmit, using beamforming and a second port, a second signal corresponding to the symbol, wherein aspects of the symbol are additionally modulated during the transmitting of the second signal with respect to the transmitting of the first signal such that corresponding aspects of a combined signal of the first signal and second signal are beam-formed in one or more directions that at least partially overlap the geographic sector, and the combined signal is retransmitted at different times such that each transmission of the combined signal at different times corresponds to the one of the one or more directions, receive an indication from a receiver identifying one or more of the aspects of the combined signal, wherein the indication is based at least in part on measurements of the one or more of the aspects of the second signal, and determine a refined beam for subsequent transmissions based at least in part on the indication.

A non-transitory computer readable medium for wireless communication is described. The non-transitory computer-readable medium may include instructions operable to cause a processor to transmit, using beamforming and a first port, a first signal corresponding to a symbol so as to cover a geographic sector, transmit, using beamforming and a second port, a second signal corresponding to the symbol, wherein aspects of the symbol are additionally modulated during the transmitting of the second signal with respect to the transmitting of the first signal such that corresponding aspects of a combined signal of the first signal and second signal are beam-formed in one or more directions that at least partially overlap the geographic sector, and the combined signal is retransmitted at different times such that each transmission of the combined signal at different times corresponds to the one of the one or more directions, receive an indication from a receiver identifying one or more of the aspects of the combined signal, wherein the indication is based at least in part on measurements of the one or more of the aspects of the second signal, and determine a refined beam for subsequent transmissions based at least in part on the indication.

Some examples of the method, apparatus, and non-transitory computer-readable medium described above may further include processes, features, means, or instructions for transmitting a reference combined signal corresponding to a first time instance that includes a reference modulation applied to the second signal transmitted by the second port, with respect to the first signal transmitted by the first port. Some examples of the method, apparatus, and non-transitory computer-readable medium described above may further include processes, features, means, or instructions for transmitting the combined signal corresponding to a second time instance, wherein aspects of the combined signal transmitted in the second time instance include aspects that may be beam-formed in one or more directions.

A method of for wireless communication is described. The method may include receiving a first signal from a transmitter, the first signal corresponding to a symbol and transmitted so as to cover a geographic sector, receiving a second signal from the transmitter, the second signal corresponding to the symbol, wherein aspects of the symbol are additionally modulated during transmission of the second signal with respect to a transmission of the first signal such that corresponding aspects of a combined signal of the first signal and the second signal are beam-formed in one or more directions that at least partially overlap the geographic sector, measuring one or more of the aspects of the combined signal, and determining a refined beam for subsequent transmissions based at least in part on the measuring.

An apparatus for wireless communication is described. The apparatus may include means for receiving a first signal from a transmitter, the first signal corresponding to a symbol and transmitted so as to cover a geographic sector, means for receiving a second signal from the transmitter, the second signal corresponding to the symbol, wherein aspects of the symbol are additionally modulated during transmission of the second signal with respect to a transmission of the first signal such that corresponding aspects of a combined signal of the first signal and the second signal are beam-formed in one or more directions that at least partially overlap the geographic sector, means for measuring one or more of the aspects of the combined signal, and means for determining a refined beam for subsequent transmissions based at least in part on the measuring.

Another apparatus for wireless communication is described. The apparatus may include a processor, memory in electronic communication with the processor, and instructions stored in the memory. The instructions may be operable to cause the processor to receive a first signal from a transmitter, the first signal corresponding to a symbol and transmitted so as to cover a geographic sector, receive a second signal from the transmitter, the second signal corresponding to the symbol, wherein aspects of the symbol are additionally modulated during transmission of the second signal with respect to a transmission of the first signal such that corresponding aspects of a combined signal of the first signal and the second signal are beam-formed in one or more directions that at least partially overlap the geographic sector, measure one or more of the aspects of the combined signal, and determine a refined beam for subsequent transmissions based at least in part on the measuring.

A non-transitory computer readable medium for wireless communication is described. The non-transitory computer-readable medium may include instructions operable to cause a processor to receive a first signal from a transmitter, the first signal corresponding to a symbol and transmitted so as to cover a geographic sector, receive a second signal from the transmitter, the second signal corresponding to the symbol, wherein aspects of the symbol are additionally modulated during transmission of the second signal with respect to a transmission of the first signal such that corresponding aspects of a combined signal of the first signal and the second signal are beam-formed in one or more directions that at least partially overlap the geographic sector, measure one or more of the aspects of the combined signal, and determine a refined beam for subsequent transmissions based at least in part on the measuring.

In some examples of the method, apparatus, and non-transitory computer-readable medium described above, the symbol may be a beam refinement symbol, at least a portion of a control symbol, or at least a portion of a data symbol. Some examples may further include processes, features, means, or instructions for receiving a reference combined signal corresponding to a first time instance that includes a reference modulation applied to the second signal transmitted by the second port, with respect to the first signal transmitted by the first port. Some examples may further include processes, features, means, or instructions for receiving the combined signal corresponding to a second time instance, wherein aspects of the combined signal transmitted in the second time instance includes aspects that may be beam-formed in one or more directions.

Some examples of the method, apparatus, and non-transitory computer-readable medium described above may further include processes, features, means, or instructions for transmitting an indication of the refined beam to the transmitter. In some examples, the indication may be further based on measurements of the one or more of the aspects of the combined signal in reference to corresponding aspects of the reference signal.

In some examples of the method, apparatus, and non-transitory computer-readable medium described above, the first signal may be in a first orthogonal frequency-division OFDM symbol, and the second signal may be in a second OFDM symbol, wherein the combined signal includes a plurality of tone beams each corresponding to one of the one or more directions. Some examples may further include processes, features, means, or instructions for measuring an aspect of the combined signal with reference to the reference combined signal comprises measuring a gain of the combined signal normalized by the gain of the reference combined signal.

In some examples of the method, apparatus, and non-transitory computer-readable medium described above, measuring the gain of the combined signal normalized by the gain of the reference combined signal comprises: determining a set of adjacent tone beams having maximum gain. In some examples of the method, apparatus, and non-transitory computer-readable medium described above, the method further comprising measuring, for each tone beam in the set, relative gains of tone beams that may be not included in the set at directions corresponding to where the tone beams in the set may have maximum gain. Some examples of the method, apparatus, and non-transitory computer-readable medium described above may further include processes, features, means, or instructions for comparing the relative gains of the tone beams that may be not included in the set with a known set of gain differences.

In some examples of the method, apparatus, and non-transitory computer-readable medium described above, determining the refined beam for subsequent transmissions further comprises: sensing an orientation of a transmit array transmitting the first signal and the second signal. In some examples of the method, apparatus, and non-transitory computer-readable medium described above, the method further comprising determining the refined beam based at least in part on the orientation of the transmit array. Some examples may further include processes, features, means, or instructions for sensing the orientation of the transmit array using an accelerometer or a gyroscope.

Some examples of the method, apparatus, and non-transitory computer-readable medium described above may further include processes, features, means, or instructions for measuring an aspect of the combined signal with reference to the reference combined signal comprises measuring a phase of the combined signal normalized by the phase of the reference combined signal. In some examples, measuring the phase of the combined signal normalized by the phase of the reference combined signal comprises: determining a set of adjacent tone beams. In some examples of the method, apparatus, and non-transitory computer-readable medium described above, the method further comprising measuring, for each tone beam in the set, relative phase difference of tone beams.

Some examples of the method, apparatus, and non-transitory computer-readable medium described above may further include processes, features, means, or instructions for receiving, from the transmitter, a repeated transmission of the first and second signals resulting in a second combined signal wherein aspects of the second combined signal may be beam-formed in one or more directions that at least partially overlap with a second geographic sector. Some examples of the method, apparatus, and non-transitory computer-readable medium described above may further include processes, features, means, or instructions for measuring one or more of the aspects of the second combined signal with respect to a reference combined signal. Some examples of the method, apparatus, and non-transitory computer-readable medium described above may further include processes, features, means, or instructions for determining a different refined beam for subsequent transmissions based at least in part on the measuring. Some examples of the method, apparatus, and non-transitory computer-readable medium described above may further include processes, features, means, or instructions for transmitting an indication identifying the different refined beam for subsequent transmissions.

Some examples of the method, apparatus, and non-transitory computer-readable medium described above may further include processes, features, means, or instructions for transmitting an indication of the refined beam to the transmitter, wherein the indication comprises either a direction to be used by the refined beam or a beam index corresponding to the direction to be used by the refined beam. In some examples, the beam index may be defined through either a predetermined table or via a prior message exchange with the transmitter.

In some examples of the method, apparatus, and non-transitory computer-readable medium described above, the beam refinement symbol of the first signal and the beam refinement symbol of the second signal may be included in either the preamble, middle, or tail of respective transmission packets. Some examples may further include processes, features, means, or instructions for identifying a sector identification, a network identification, a panel identification, or combinations thereof, in one or both of the first signal and the second signal.

Some examples of the method, apparatus, and non-transitory computer-readable medium described above may further include processes, features, means, or instructions for receiving the combined signal during a sector sweep phase. Some examples of the method, apparatus, and non-transitory computer-readable medium described above may further include processes, features, means, or instructions for transmitting an indication of the refined beam to the transmitter as part of a feedback message. In some examples, the combined signal may be associated with one or more synchronization signals or one or more reference signals of the sector sweep phase. In some examples, the feedback message may be one of an ABFT signal, a R-TXSS signal, or a RACH signal.

Some examples of the method, apparatus, and non-transitory computer-readable medium described above may further include processes, features, means, or instructions for transmitting a request for beam refinement. Some examples may further include processes, features, means, or instructions for receiving the first signal and the second signal in response to the request.

A method of for wireless communication is described. The method may include receiving a first signal from a transmitter, the first signal corresponding to a symbol and transmitted so as to cover a geographic sector, receiving a second signal from the transmitter, the second signal corresponding to the symbol, wherein aspects of the symbol are additionally modulated during transmission of the second signal with respect to a transmission of the first signal such that corresponding aspects of a combined signal of the first signal and the second signal are beam-formed in one or more directions that at least partially overlap the geographic sector, and the combined signal is received at different times such that each transmission of the combined signal at different times corresponds to one of the one or more directions, measuring one or more of the aspects of the combined signal, and determining a refined beam for subsequent transmissions based at least in part on the measuring.

An apparatus for wireless communication is described. The apparatus may include means for receiving a first signal from a transmitter, the first signal corresponding to a symbol and transmitted so as to cover a geographic sector, means for receiving a second signal from the transmitter, the second signal corresponding to the symbol, wherein aspects of the symbol are additionally modulated during transmission of the second signal with respect to a transmission of the first signal such that corresponding aspects of a combined signal of the first signal and the second signal are beam-formed in one or more directions that at least partially overlap the geographic sector, and the combined signal is received at different times such that each transmission of the combined signal at different times corresponds to one of the one or more directions, means for measuring one or more of the aspects of the combined signal, and means for determining a refined beam for subsequent transmissions based at least in part on the measuring.

Another apparatus for wireless communication is described. The apparatus may include a processor, memory in electronic communication with the processor, and instructions stored in the memory. The instructions may be operable to cause the processor to receive a first signal from a transmitter, the first signal corresponding to a symbol and transmitted so as to cover a geographic sector, receive a second signal from the transmitter, the second signal corresponding to the symbol, wherein aspects of the symbol are additionally modulated during transmission of the second signal with respect to a transmission of the first signal such that corresponding aspects of a combined signal of the first signal and the second signal are beam-formed in one or more directions that at least partially overlap the geographic sector, and the combined signal is received at different times such that each transmission of the combined signal at different times corresponds to one of the one or more directions, measure one or more of the aspects of the combined signal, and determine a refined beam for subsequent transmissions based at least in part on the measuring.

A non-transitory computer readable medium for wireless communication is described. The non-transitory computer-readable medium may include instructions operable to cause a processor to receive a first signal from a transmitter, the first signal corresponding to a symbol and transmitted so as to cover a geographic sector, receive a second signal from the transmitter, the second signal corresponding to the symbol, wherein aspects of the symbol are additionally modulated during transmission of the second signal with respect to a transmission of the first signal such that corresponding aspects of a combined signal of the first signal and the second signal are beam-formed in one or more directions that at least partially overlap the geographic sector, and the combined signal is received at different times such that each transmission of the combined signal at different times corresponds to one of the one or more directions, measure one or more of the aspects of the combined signal, and determine a refined beam for subsequent transmissions based at least in part on the measuring.

Some examples of the method, apparatus, and non-transitory computer-readable medium described above may further include processes, features, means, or instructions for receiving a reference combined signal corresponding to a first time instance that includes a reference modulation applied to the second signal transmitted by the second port, with respect to the first signal transmitted by the first port. Some examples of the method, apparatus, and non-transitory computer-readable medium described above may further include processes, features, means, or instructions for receiving the combined signal corresponding to a second time instance, wherein aspects of the combined signal transmitted in the second time instance includes aspects that may be beam-formed in one or more directions.

DETAILED DESCRIPTION

Figure 1:
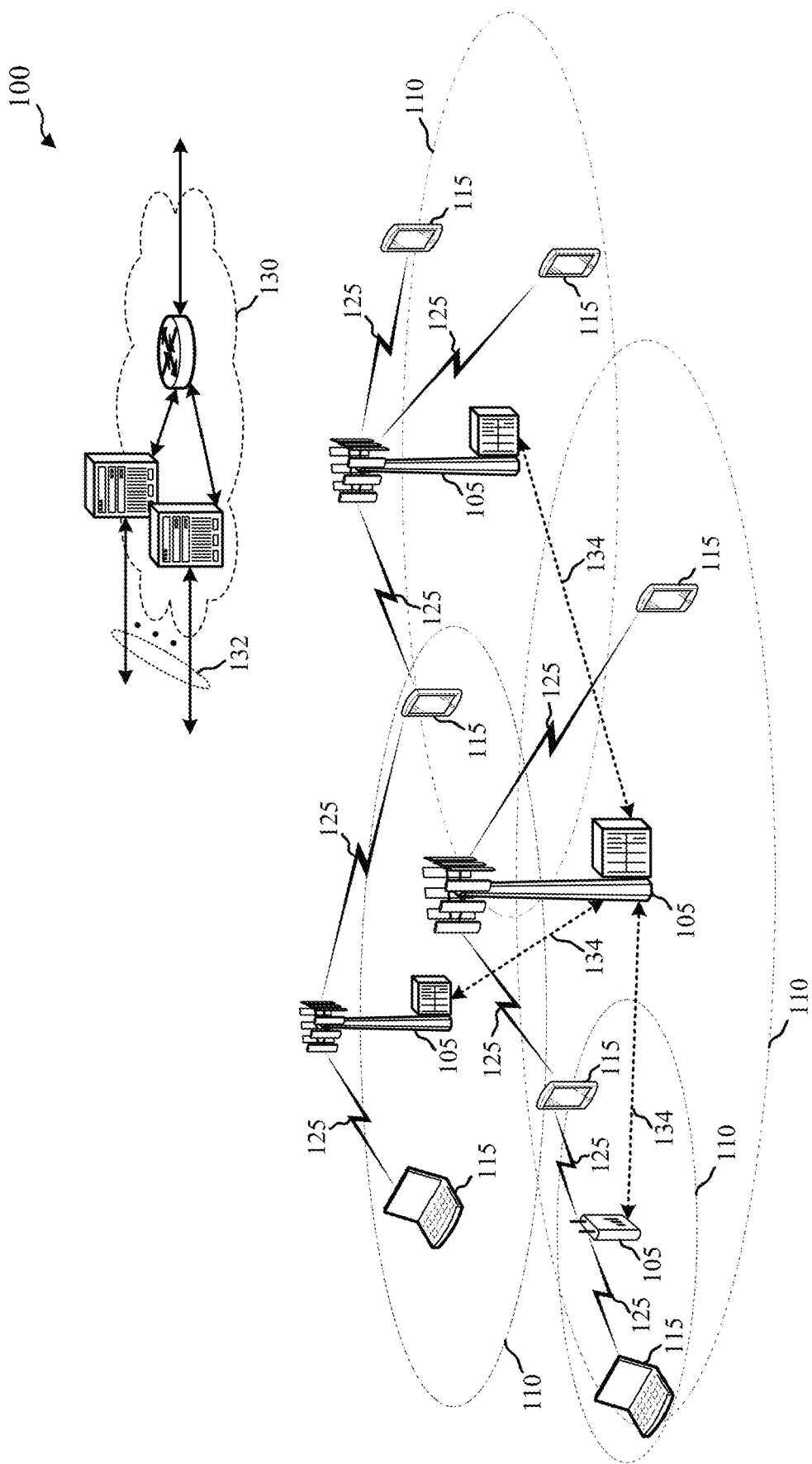
FIGS. 1 and 2 illustrate examples of wireless communications systems that support millimeter wave (mmW) beam refinement in accordance with aspects of the present disclosure.

In a millimeter wave (mmW) system, a base station and a user equipment (UE) may communicate via one or more directional beams. A transmitter (e.g. a base station) may engage in a beam sweeping operation to establish an active transmit beam with a receiver (e.g., a UE). A transmitter may also engage in beam tracking to maintain a connection with a UE. In some cases, a base station may perform a sector sweep with wide-formed, lower gain beams to establish a primary connection. Then, the base station may perform beam refinement using narrower, higher gain beams, and the UE may identify a transmit beam on which subsequent communications should be performed. The base station may perform a continuous beam tracking process by adjusting the refined beam to maintain the improved connection. However, such beam refinement procedures may require multiple transmissions including multiple training symbols, and thus the UE may remain in an awake mode expending power and the base station and UE may unnecessarily utilize resources during the refinement process, resulting in less than optimal efficiency.

Instead, a transmitter and receiver may utilize a more efficient beam refinement process to establish a connection using a preferred, high-gain directional transmit beam. The transmitter may leverage both analog and digital ports to provide a set of directional beams to be used in communications with the receiver, from which the receiver may identify a transmit beam with the highest gain. In some examples, a transmitter may use a first port to transmit a first signal, which may be a beam refinement symbol, to produce a wide beam, which may be an analog beam. In some examples, the analog beam may be transmitted at a constant elevation across all tones. The analog beam may be beam-formed to create a sector in a spatial direction corresponding to a receiver (e.g., where the receiver is located), and the direction may be based on prior communications with the receiver or based on a sequential beam sweeping operation. The transmitter may use a second port to again transmit the beam refinement symbol in a second signal, but may modulate (e.g., phase modulate or amplitude modulate) the beam refinement symbol to create multiple directional beams which may spatially overlap with the first analog beam. The first symbol and the second symbol may create a combined signal. For example, the combined signal may create directional beams that correspond to different tones (e.g., beams using different tones may be transmitted in different directions). Alternatively, each directional beam may correspond to a different point in time (e.g., beams transmitted at different times may be transmitted in different directions). The receiver may receive the combined signal, and may determine which of the generated directional beams has the highest gain based on a product of the gain of the first analog beam generated by the first port and the gains of the directional beams generated by the second port. In some examples, the receiver may compare signal strengths of each directional beam against each other to determine the preferred refined beam for communication. For example, measurements of gain may be taken based on a reference combined signal, which may be received prior to the transmission and reception of the combined signal. The reference combined beam and the reference combined signal may be transmitted subsequently, at different points in time. In some examples, measurements of the phase of a combined signal with respect to a reference combined signal may be taken to determine the preferred refined beam.

In response to a receiver indicating which of the generated directional beams is the preferred directional beam, the transmitter may adjust future transmissions to correspond to the preferred directional beam. In some examples, the transmitter may rotate the analog beam to point in the spatial direction of the initially identified preferred directional beam. Alternatively, the transmitter may utilize the analog and/or digital ports to generate a higher gain beam in the direction of the initially identified preferred directional beam.

When performing the beam refinement process, the transmitter may utilize a plurality of antenna panels to transmit the beam refinement symbols. The transmitter may utilize a single antenna panel that utilizes and transmits the beam refinement symbol and the phase shifted beam refinement symbol from two ports. In some examples, a second antenna sub-array on the panel may be offset from a first antenna sub-array, wherein the first and second sub-arrays correspond to the first and second ports respectively. In other examples, the sub-arrays of both ports may be arranged in a linear manner, with a single row of antennas. In such examples, the antennas may alternate between antennas corresponding to the first port and antennas corresponding to the second port, such that an antenna in the row does not correspond to the same port as either of its adjacent antennas. In yet other examples, the second sub-array may be aligned with and parallel to the first sub-array. In some examples, a switching matrix may be utilized to direct both the beam refinement symbol and the phase shifted beam refinement symbol to the first antenna panel, while the second antenna panel remains inactive. In other examples, multiplexing may be utilized to combine both port beam refinement symbols and direct them to the first antenna panel. Subsequent data transmissions after the beam refinement process may utilize multiple panels. Such techniques may reduce the time needed for beam refinement in a wireless communications system.

Aspects of the disclosure are initially described in the context of a wireless communications system. Aspects of the disclosure are illustrated by examples of wireless communications systems, and process flows. Aspects of the disclosure are further illustrated by and described with reference to apparatus diagrams, system diagrams, and flowcharts that relate to beam refinement for mmW systems.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may support mmW beam refinement. In some examples, a transmitter (e.g., base station 105) may send a first transmission via a first port and a second transmission via a second port, that may be utilized by a receiver (e.g., UE 115) to determine a preferred directional transmit beam for subsequent transmissions. For example, the first transmission may include a beam refinement symbol that generates a wide beam (e.g., an analog beam) and the second transmission may include a phase shifted (e.g., digitally phase shifted) beam refinement symbol that generates multiple candidate refined beams for subsequent transmissions.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support mmW communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases, the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each orthogonal frequency-division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD or a combination of both.

Figure 2:
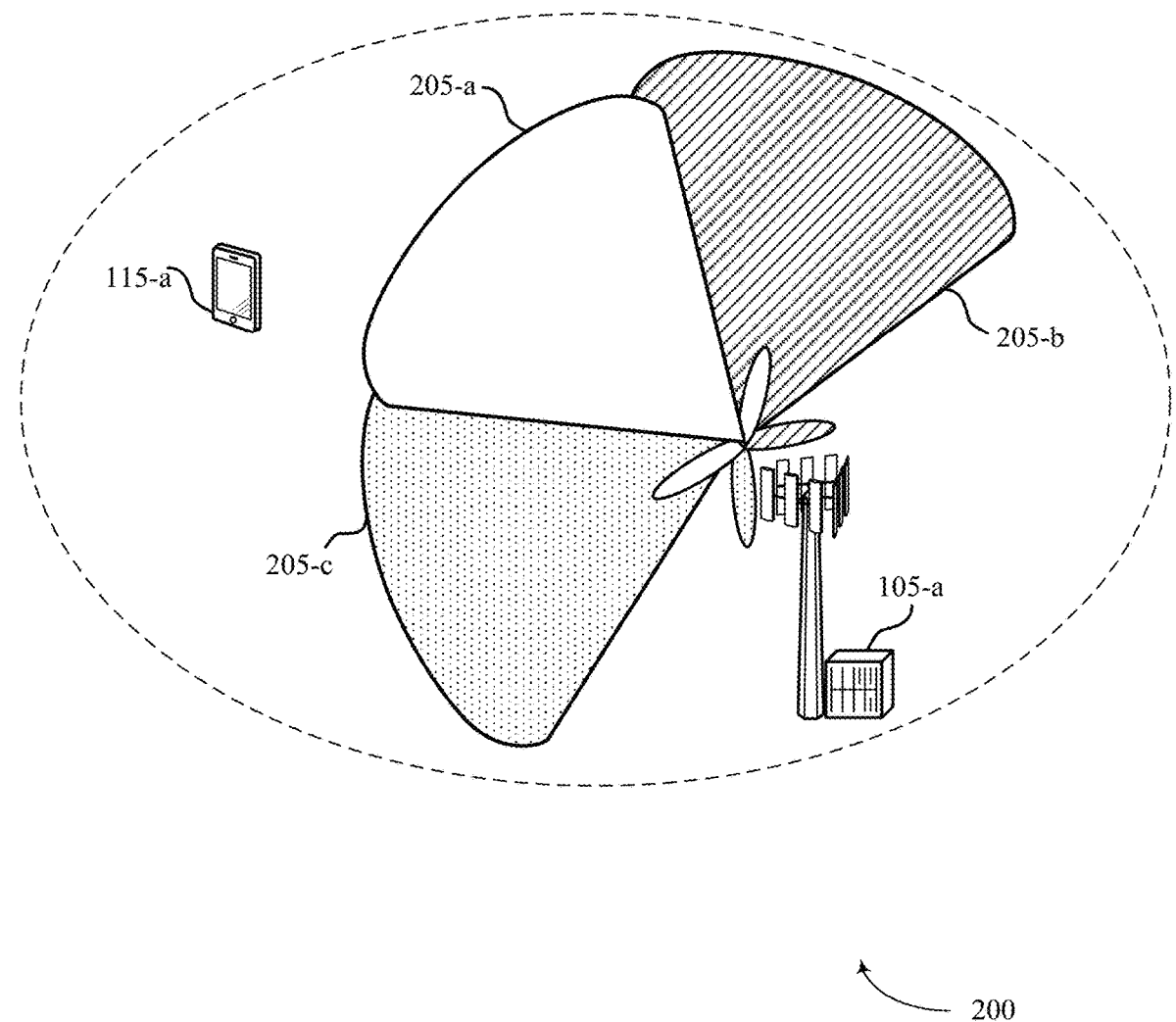

FIG. 2 illustrates an example of a wireless communications system 200 that supports mmW beam refinement in accordance with various aspects of the present disclosure. Wireless communications system 200 may include a base station 105-a and a UE 115-a, which may be examples of the corresponding devices described with reference to FIG. 1. Base station 105-a and UE 115-a may communicate using one or more directional beams. In wireless communications system 200, a transmitter (e.g., base station 105-a) may engage in a beam sweeping operation to establish an active transmit beam with a receiver (e.g., UE 115-a), or beam tracking to maintain a connection with the receiver (e.g., UE 115-a). In some examples, a receiver (e.g., UE 115-a) may engage in a beam sweeping operation to establish an active transmit beam with a transmitter (e.g., base station 105-a), or beam tracking to maintain a connection with a transmitter (e.g., base station 105-*a*). In some examples, a transmitter may be a first UE 115 and a receiver may be a base station 105 or a second UE 115.

In some examples, base station 105-*a* may engage in a beam sweeping operation to establish an active transmit beam with UE 115-*a*. In some examples, base station 105-*a* may also engage in a beam tracking procedure to maintain a connection with UE 115-*a*. Base station 105-*a* may use a first port to transmit a beam refinement symbol to produce a wide beam 205-*a* (e.g., an analog beam 205-*a*). The analog beam may be beamformed to correspond with a geographic sector in a spatial direction where UE 115-*a* is located. The spatial direction may be based on prior communication with UE 115-*a*. For example, base station 105-*a* may have communicated previously with UE 115-*a* while UE 115-*a* was located within a geographic sector corresponding to analog beam 205-*a*. Alternatively, the spatial direction may be based on a sequential beam sweeping operation. For example, base station 105-*a* may sequentially transmit analog beam 205-*b*, then analog beam 205-*a*, then analog beam 205-*c*. In some examples, the gain across a plurality of tones corresponding to analog beam 205-*c* may be close to equal.

In some cases, analog beam 205-*c* may not be narrow enough or have a high enough gain to be a preferred directional transmit beam. Transmissions from UE 115-*a* may be more clearly received and decoded if received via a highly directional and refined transmit beam. Therefore, it may be beneficial for base station 105-*a* to generate a plurality of candidate refined beams. UE 115-*a* may identify which of the candidate refined beams is received at the highest gain, and is therefore the preferred refined beam for subsequent transmissions.

Figure 3A:
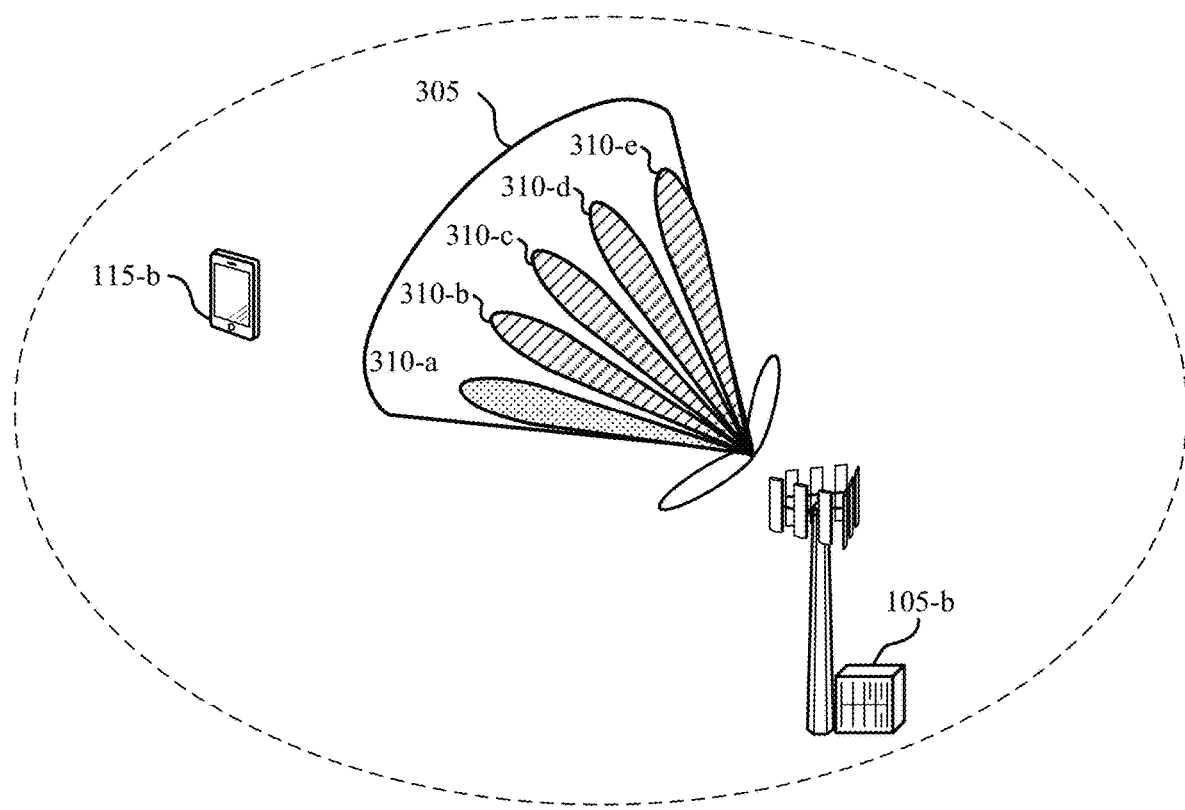
FIG. 3A illustrates an example of a wireless communication system that supports mmW beam refinement in accordance with aspects of the present disclosure.

FIG. 3A illustrates an example of a wireless communications system 300A that supports mmW beam refinement via directional dependent frequency selectivity in accordance with various aspects of the present disclosure. Wireless communications system 300A may include a base station 105-*b* and a UE 115-*b*, which may be examples of the corresponding devices described with reference to FIGS. 1-2.

To identify a preferred refined transmit beam, a transmitter (e.g., base station 105-*b*) may use a first port to transmit a beam refinement symbol to produce a wide beam, which may be an analog beam 305, in a first transmission. The analog beam may be beamformed to create a geographic sector in a spatial direction corresponding to UE 115-*b* (e.g., where UE 115-*b* is geographically located). In some examples, the gain across a plurality of tones corresponding to analog beam 305 may be close to equal.

However, subsequent transmissions may benefit from a directional transmit beam that is more refined that analog beam 305. To generate and identify a refined transmit beam, base station 105-*b* may modulate (e.g., phase modulate or amplitude modulate) the beam refinement symbol, and transmit the modulated beam refinement symbol via a second port in a second transmission. The transmission of the first signal and the second, phase-modulated signal may result in a combined signal such that corresponding aspects, such as tones, are beamformed in one or more directions that at least partly overlap with the geographic sector of analog beam 305. In some examples, the first transmission and the second transmission may each be OFDM symbols. By transmitting the combined signal, base station 105-*b* may generate one or more beam-formed refined beams, such as tone-beams 310. Each refined tone-beam 310 may correspond to a different tone and to a different spatial direction. For example, tone-beam 310-*a* may correspond to a first tone and a first direction, whereas tone-beam 310-*b* may correspond to a second tone and a second direction and so forth. In such examples, each tone-beam 310 may vary with respect to gain at a particular geographic location. The one or more tone-beams 310 may completely or partially overlap with the geographic sector of analog beam 305. In some examples, the first and second transmissions described above may be transmitted as a part of a sector sweep. In such examples, the first and second transmission may include additional information, such as a sector identification, a network identification, or other identifying information.

In some cases, prior to transmitting the combined signal, base station 105-*b* may transmit a reference combined signal. The reference combined signal may include a first signal transmitted via the first port, and a second signal transmitted via the second port. The first signal transmitted via the first port may be a wide analog beam. The second signal transmitted via the second port may be phase-modulated by some reference modulation. For example, the reference modulation may be a modulation of zero, such that the second signal is not phase-modulated at all with respect to the first signal. Alternatively, the reference modulation may be a non-zero phase-modulation, such that the second signal is modulated (e.g., phase modulated or amplitude modulated) with respect to the first signal. Base station 105-*b* may transmit the resulting reference combined signal at a first time instance and may transmit the combined signal at a second instance in time. UE 115-*b* may receive the reference combined signal, and then receive the combined signal, such that measurements of the combined signal may be made with respect to the reference combined signal.

Base station 105-*b* may control the direction of each tone-beam 310 resulting from the combined signal by altering the phase of the refinement beam symbol transmitted via the second port. The gain of a tone-beam 310 may correspond to the degrees of freedom of the transmitter. For example, a transmission corresponding to two degrees of freedom (e.g., two ports) may generate tone-beams that are relatively course, wide, and have a low gain. Alternatively, a transmitter that operates with higher degrees of freedom (e.g., more than two ports), may generate tone-beams 310 that are relatively less course, narrower, and have a higher gain. However, a transmitter operating with only two degrees of freedom may be capable of producing tone-beams 310 that vary sufficiently with respect to gain, such that a receiver (e.g., UE 115-*b*) can measure a different gain value corresponding to each tone-beam 310. UE 115-*b* may measure the gain of each tone beam 310 with respect to a previously received reference combined beam. In some examples, the transmitter may send groups of tones in a single direction. For example, the tones may be frequency interleaved or block interleaved. Tone-beam 310-*a* may include multiple tones, and tone-beam 310-*b* may include multiple tones that are distinct form the tones included in tone-beam 310-*a*. Such grouping may provide for improved robustness or improved noise averaging.

UE 115-*b* may receive a combined signal of a first and second transmission from base station 105-*b* and may utilize the received transmissions to determine a preferred tone-beam 310 for subsequent transmissions. UE 115-*b* may receive analog beam 305 that corresponds to a geographic sector in which UE 115-*b* is located, and UE 115-*b* may utilize the received tone-beams 310 to determine a preferred tone-beam for subsequent transmissions. At the physical location of UE 115-*b*, each tone-beam 310 received in the combined signal may also correspond to a different gain. In some examples, the tone-beams 310 may be relatively course, so base station 105-*b* may widely space the tone-beams to achieve sufficient gain variation at the receiver. Thus, UE 115-*b* may take measurements to determine a preferred refined beam. For example, UE 115-*b* may measure the relative gain of each tone-beam 310 and determine which is the preferred tone-beam 310 for subsequent transmissions. Additionally or alternatively, UE 115-*b* may take measurements of a phase reference of a combined signal with respect to a reference combined signal. In some examples, determining which tone beam 310 is the preferred tone beam may include making measurements with respect to a previously received reference combined signal. For example, given the geographic location of UE 115-*b*, UE 115-*b* may determine that tone-beam 310-*a* may have the highest received and measured gain. Base station 105-*b* may measure the gain of tone beam 310-*a* with respect to a previously received reference combined signal, or base station 105-*b* may measure the gain of tone-beam 310-*a* with respect to a set of known values. The resulting measurements may be sufficient to determine which refined tone-beam 310 has the highest gain, and is thus the preferred tone-beam. Based on one or more of these measurements, UE 115-*b* may identify tone-beam 310-*a* as the preferred tone-beam 310. Subsequent transmissions from base station 105-*b* may be sent via tone-beam 310-*a*.

In other examples, UE 115-*b* may identify a set of tone-beams 310 that have similar maximum gain values when measured at a particular direction. In some cases, the maximum gain values at the selected direction may be difficult to differentiate between the set of adjacent tone-beams 310. For example, the maximum gain of tone-beams 310-*a* and 310-*b* may be difficult to differentiate at the geographic location of UE 115-*b*, thus UE 115-*b* may identify refined tone-beams 310-*a* and 310-*b* as a set of adjacent tone-beams 310. To determine whether tone-beam 310-*a* or tone-beam 310-*b* will be identified as the preferred tone-beam 310, UE 115-*b* may measure the relative gains of tone-beams 310 that are not adjacent to the set of tone-beams 310 (e.g., tone-beams 310-*c*, 310-*d*, or 310-*e*). That is, the gain corresponding to refined beam 310-*e* may be measured at the direction of refined beam 310-*a*, and refined beam 310-*b*. The non-maximum gain value measured at these two directions may be easier to differentiate between than the maximum gain values of refined beam 310-*a* and refined beam 310-*b*. The relative gains of non-adjacent tone-beams 310 (e.g., tone-beam 310-*e*) may be compared with a known set of gain differences, or with values identified via a previously received reference combined signal. Based on these measurements or known values, UE 115-*b* may determine that, of the set of adjacent tone-beam 310-*a* and tone-beam 310-*b*, tone-beam 310-*a* may be selected as the preferred tone-beam 310.

In some examples, base station 105-*b* may utilize additional information to identify the preferred tone-beam. For example, UE 115-*b* may sense an orientation of a transmit array that transmitted the first transmission, and an orientation of a transmit array that transmits the second transmissions. The receiver may glean this information by leveraging sensor information (e.g., accelerometer data and gyroscopic data).

UE 115-*b* may identify the preferred tone-beam 310-*a* to base station 105-*b*, and base station 105-*b* may subsequently communicate with UE 115-*b* based on the identification. UE 115-*b* may send an indication regarding the identity of the preferred tone-beam 310-*a* to base station 105-*a* in one or more of a variety of information types. For example, the UE 115-*b* may identify preferred tone-beam 310-*a* in terms of a fine beam index. Alternatively, UE 115-*b* may identify preferred tone-beam 310-*a* in terms of a direction corresponding to preferred tone-beam 310-*a*. In response to the indication, base station 105-*b* may alter the first and second transmission to transmit data to the receiver at a higher gain. In some examples, base station may rotate the geographic sector corresponding to the analog beam based on the preferred refined beam (e.g., the preferred tone-beam).

Figure 3B:
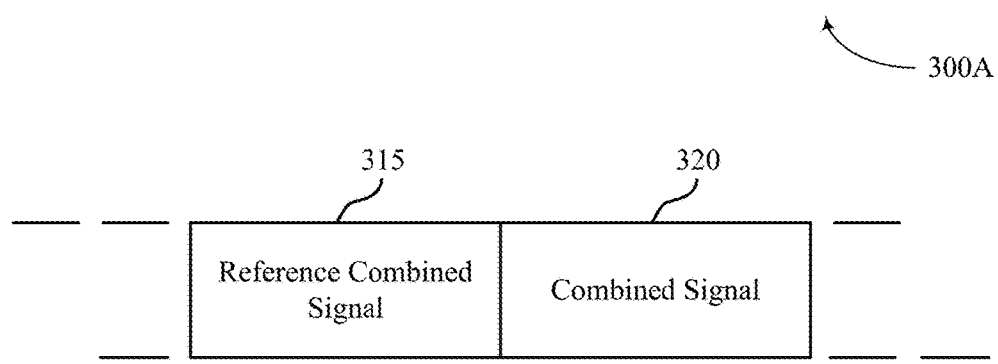
FIG. 3B illustrates an example of a first and second transmission that support mmW beam refinement in accordance with aspects of the present disclosure.

FIG. 3B illustrates an example of a first and second transmissions 300B that support beam refinement for mmW systems in accordance with various aspects of the present disclosure. First and second transmissions 300 may be examples of or may represent aspects of techniques performed by UE 115 or base station 105 as described with reference to FIGS. 1-3A.

A transmitter (e.g., base station 105-*b*) may use a first port to transmit a beam refinement symbol to produce a wide beam, such as an analog beam in a first signal. A base station 105 may modulate (e.g., phase modulate or amplitude modulate) the beam refinement symbol, and transmit the modulated beam refinement symbol via a second port, resulting in a combined signal with directional dependent frequency selectivity. In some cases, a base station 105-*b* may transmit a reference combined signal 315 at a first time instance, and combined signal 320 at a second time instance. Reference combined signal 315 and combined signal 320 may be beamformed to create a geographic sector in a spatial direction corresponding to a UE 115 (e.g., where UE 115 is geographically located). In some examples, the gain across a plurality of tones corresponding to reference combined signal 315 may be close to equal. Base station 105-*b* may phase modulate the beam refinement symbol with a phase modulation that is different from that of reference combined signal 315, such that the gains of tone-beams generated by combined signal 320 may be distinct with respect to the gain across tones corresponding to reference combined signal 315. Thus, UE 115-*b* may measure the gain of tone-beams generated by the transmission of combined signal 320 with respect to reference combined signal 315, and thereby select a preferred tone-beam 310.

Reference combined signal 315 and combined signal 320 may be transmitted in the preamble, middle, or tail of a data packet. In some examples, reference combined signal 315 and combined signal 320 may be transmitted with every data packet in a series of data packets. Alternatively, reference combined signal 315 and combined signal 320 may be transmitted preceding each data packet in a series of data packets. Such examples provide an opportunity to base station 105 and UE 115 to engage in a re-training procedure.

In some examples, reference combined signal 315 and combined signal 320 may be transmitted in pairs as a part of a sector sweeping procedure. In such examples, reference combined signal 315 and combined signal 320 may include information such as sector identifiers and network identifiers, which may be incorporated into additional symbols.

In FIGS. 3A and 3B, combined signals are utilized by UE 115-*b* to identify a preferred refined beam, such as preferred tone-beam 310-*a*. Having identified preferred tone-beam 310-*a*, it may be beneficial for base station 105-*b* to alter subsequent transmissions. For example, preferred tone-beam 310-*a* may be located on the edge of the geographic sector covered by analog beam 305. In such cases, analog beam 305 may not be oriented in the optimal position for future transmissions. Alternatively or additionally, UE 115-*b* may identify the preferred direction of tone-beam 310-*a*.

However, subsequent transmissions may be more successful if base station 105-*b* casts preferred tone-beam 310-*a* at a higher gain.

Figure 4:
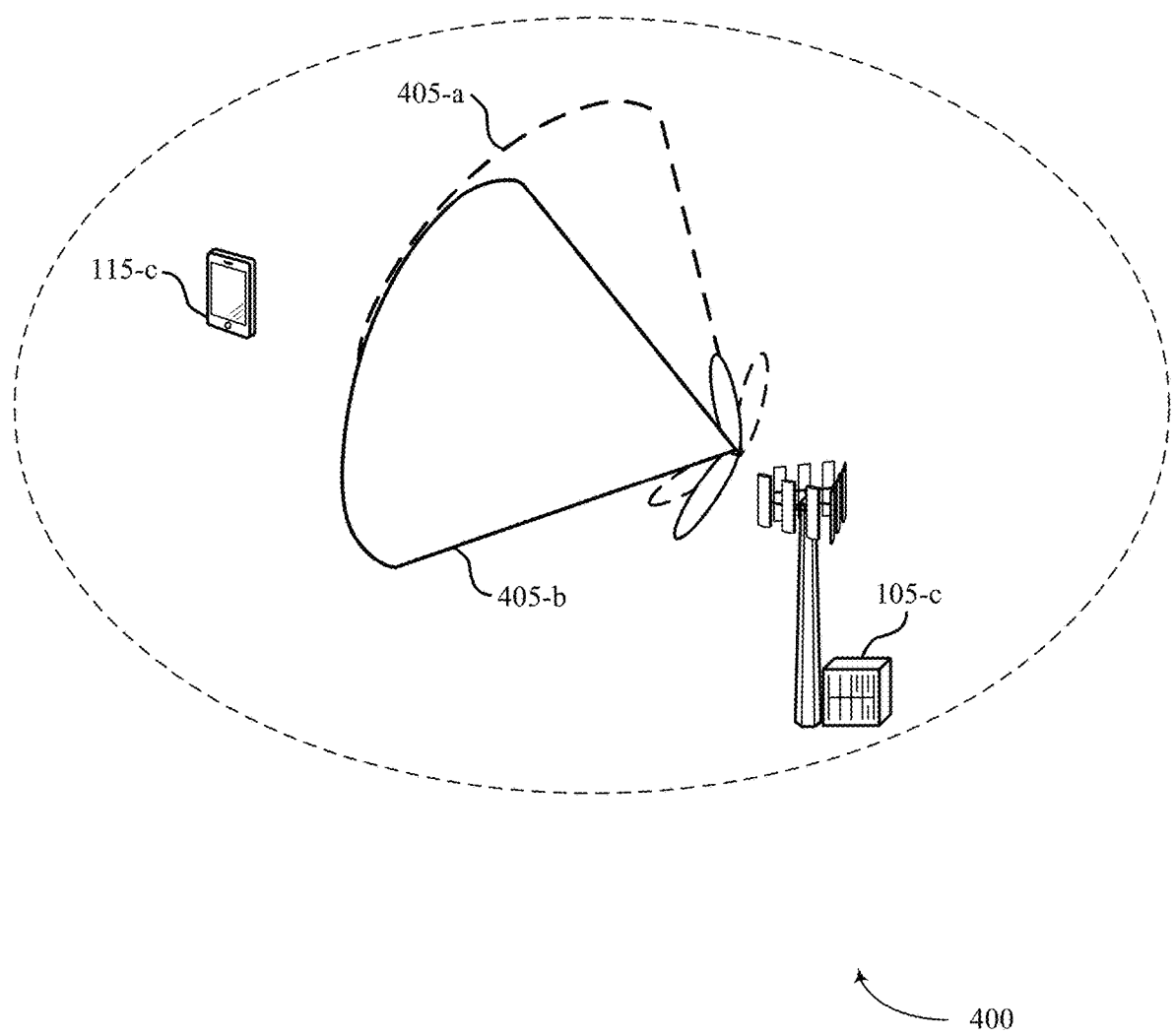
FIGS. 4 through 6 illustrate examples of wireless communications systems that support mmW beam refinement in accordance with aspects of the present disclosure.

FIG. 4 illustrates an example of a wireless communications system 400 that supports mmW beam refinement in accordance with various aspects of the present disclosure. Wireless communications system 400 may include a base station 105-*c* and a UE 115-*c*, which may be examples of the corresponding devices described with reference to FIGS. 1-3B.

As described with reference to FIG. 3A, a transmitter (e.g., base station 105-*c*) may send a first transmission that generates a course analog beam 405-*a* and a second transmission that generates a modulated (e.g., phase modulated or amplitude modulated) beam refinement symbol, resulting in a combined signal with directional dependent frequency selectivity. UE 115-*c* may identify and indicate to base station 105-*c* a tone-beam associated with a spatial direction, based on the measurable differences between the gains of tone-beams generated by the combined signal. However, base station 105-*c* may adjust future analog and digital beamforming based on the identified tone-beam and spatial direction.

As described above, base station 105-*c* may use a first port to transmit a first signal, such as a beam refinement symbol, to produce a first analog beam 405-*a* in a first transmission. First analog beam 405-*a* may be beamformed to create a geographic sector in a spatial direction corresponding to UE 115-*c* (e.g., where UE 115-*c* is geographically located). Base station 105-*c* may phase modulate the first signal (e.g., the beam refinement symbol), and transmit the phase modulated beam refinement symbol via a second port in a second transmission. The transmission of the first signal and the second signal may result in a combined signal, with directional dependent frequency selectivity. UE 115-*c* may receive the combined signal. UE 115-*c* may utilize the received combined signal to identify a preferred transmit tone-beam for use in subsequent transmissions. For example, the preferred tone-beam may be located at the edge of the geographic sector corresponding to first analog beam 405-*a*. In response to the indication, base station 105-*c* may adjust subsequent transmissions to correspond to the preferred tone-beam. For example, base station 105-*c* may rotate the direction of first analog beam 405-*a* and instead transmit second analog beam 405-*b* in a different direction. Second analog beam 405-*b* may be pointed in the direction of the initially identified preferred tone-beam, such that UE 115-*c* receives subsequent transmissions at a maximum gain.

Figure 5:
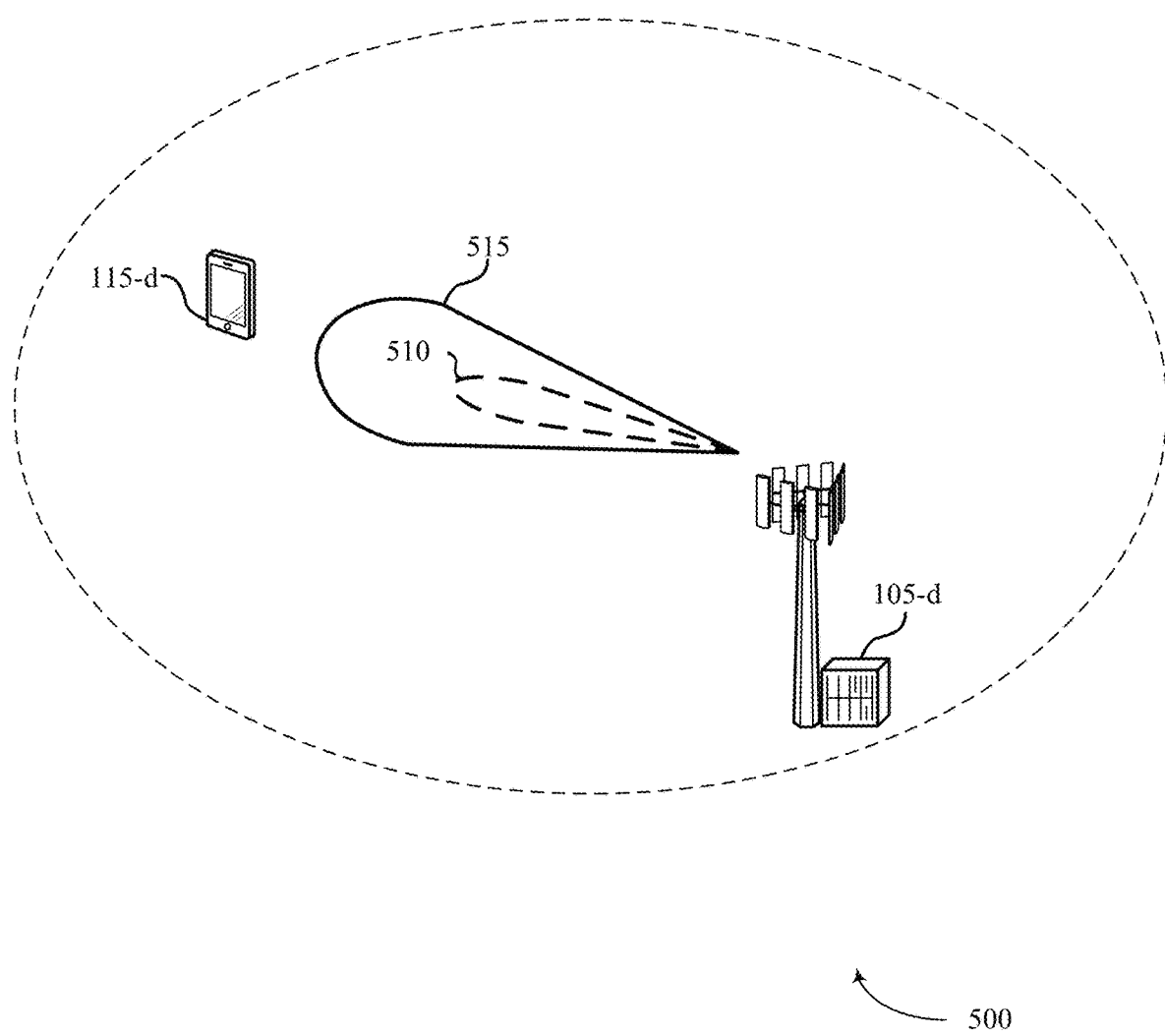

FIG. 5 illustrates an example of a wireless communications system 500 that supports mmW beam refinement in accordance with various aspects of the present disclosure. Wireless communications system 500 may include a base station 105-*d* and a UE 115-*d*, which may be examples of the corresponding devices described with reference to FIGS. 1-4.

As described with reference to FIG. 3A, a transmitter (e.g., base station 105-*d*) may send a first transmission that generates a course beam, such as an analog beam, and a second transmission that generates a modulated (e.g., phase modulated or amplitude modulated) beam refinement symbol, resulting in a combined signal of the first and second signal, with directional dependent frequency selectivity. A receiver (e.g. UE 115-*d*) may identify and indicate to base station 105-*c* a tone-beam associated with a spatial direction. However, base station 105-*d* may adjust future analog and digital beamforming based on the identified tone-beam and spatial direction. As described with reference to FIG. 4, base station 105-*d* may rotate the analog beam for subsequent transmissions. However, in some situations base station 105-*d* may instead alter the gain of a beam-refined transmit beam.

UE 115-*d* may receive the combined signal. UE 115-*d* may utilize the received combined signal to identify a preferred transmit tone-beam 510 for use in subsequent transmissions. UE 115-*d* may transmit an indication of preferred transmit tone-beam 510 to base station 105-*d*. Base station 105-*d* may leverage available degrees of freedom (e.g., number of ports) to cast a higher gain beam 515 in the same direction as preferred tone-beam 510. In some examples, base station 105-*d* may cast higher gain beam 515 in the indicated direction by adjusting the digital phase modulation of the modulated beam refinement symbol transmitted via the second port.

To provide the necessary support for the method described with respect to FIGS. 2-6, various apparatuses may be incorporated at base station 105-*d*. For example, beam refinement symbols and phase shifted beam refinement symbols may require transformation and conversion from digital to analog. Weights may be applied at a plurality of antennas to generate the beam refinement symbol and the phase shifted beam refinement symbol. Additionally, refined beams may be generated that correspond to tones, or times.

Figure 6:
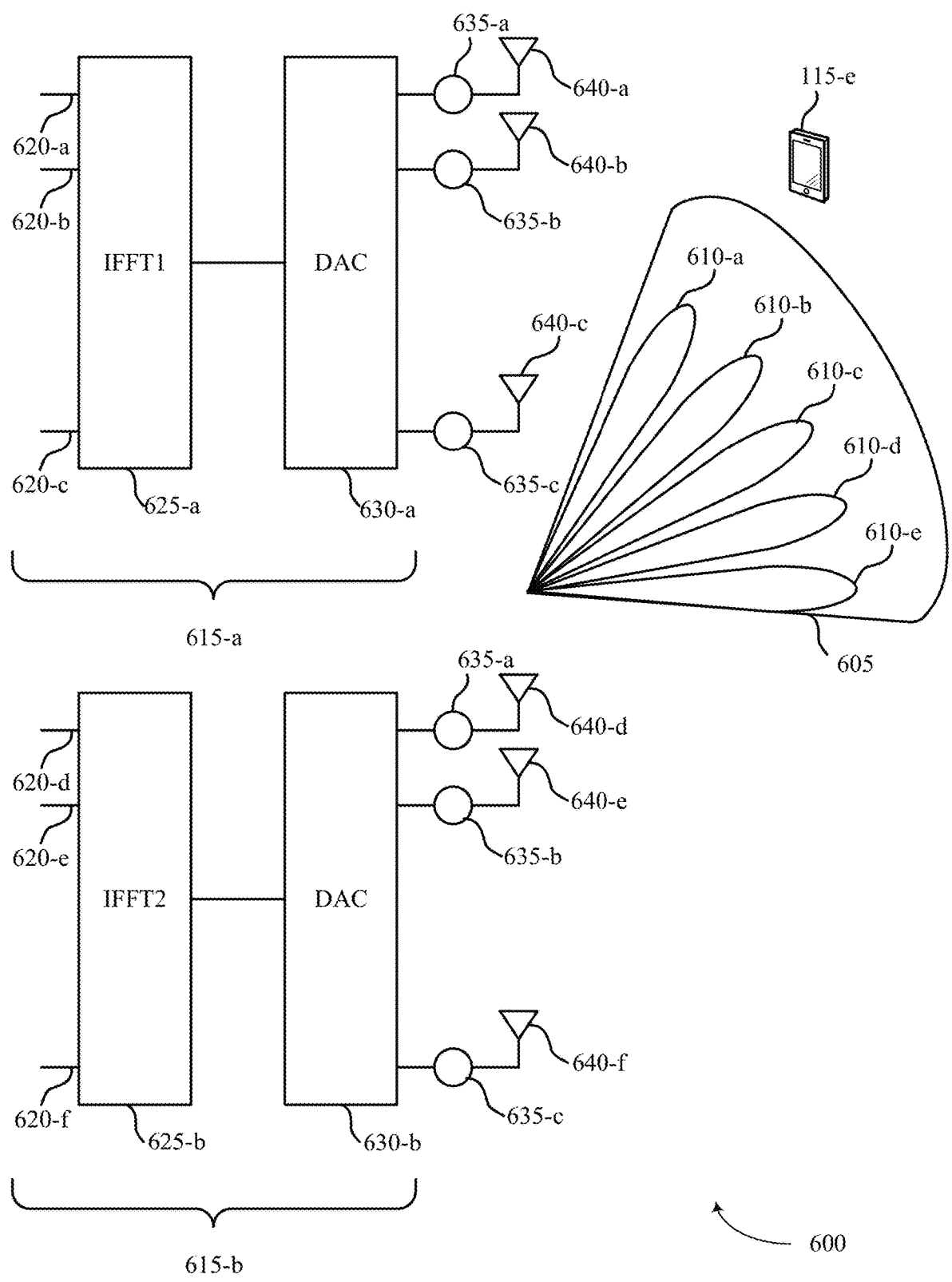

FIG. 6 illustrates an example of a wireless communications system 600 that supports mmW beam refinement in accordance with various aspects of the present disclosure. Wireless communications system 600 may include a base station 105 and a UE 115-*e*, which may be examples of the corresponding devices described or may represent aspects of techniques performed by UE 115 or base station 105 as described with reference to FIGS. 1-5.

A transmitter (e.g., a base station 105) may have a plurality of subarrays. For example, a first subarray 615-*a* may correspond to a first port, and a second subarray 615-*b* may correspond to a second port. The transmitter may send a plurality of signals 620 to a receiver (e.g., UE 115-*e*). For example, first subarray 615-*a* may transmit signals 620-*a*, 620-*b*, and 620-*c*. The plurality of signals 620 may be transformed by a first inverse fast Fourier transform (IFFT) 625-*a* and converted from digital signals to analog signals at digital-to-analog converter (DAC) 630-*a*. Then, the signals may be transmitted by a plurality of antennas 640. Each antenna 640 may be weighted or directed by a weight 635. For example, first antenna 640-*a* may be weighted by weight 635-*a*, second antenna 640-*b* may be weighted by weight 635-*b*, and third 640-*c* antenna may be weighted by weight 635-*c*. It should be understood that more than three antennas 640 may be utilized by first sub-array 615-*a* and second subarray 615-*b*, and more than three signals 620 may be transformed, converted, and sent by subarrays 615-*a* and 615-*b*. By weighting antennas 640 with weights 635, first subarray 615-*a* may transmit a beam refinement signal via analog beam 605. Analog beam 605 may be oriented in a geographic sector that corresponds to the geographic location of UE 115-*e*.

Second subarray 615-*b* may phase modulate signals 620. That is, signal 620-*d* may be equivalent to signal 620-*a*, but may be phase shifted. For example, if signal 620-*a* is represented by B, then signal 620-*d* may be phase shifted such that signal 620-*d* is represented by $Be^{j\alpha}$. IFFT2 625-*b* may transform the phase modulated signals 620 and DAC 630-*b* may convert them from digital to analog form. Phase modulated signals 620 may then be transmitted to UE 115-*e* by a plurality of antennas 640. Antennas 640 corresponding to the second subarray 615-*b* may be weighted identically to antennas 640 corresponding to the first subarray 615-*a*. For example, antenna 640-*d* may be weighted similarly by weight 635-*a* as described for first subarray 615-*a*. By weighting antennas 640 with weights 635, second subarray 615-*b* may transmit a phase shifted beam refinement signal. The transmission of signals 620-*a*, 620-*b*, and 620-*c* in combination with the transmission of phase modulated signals 620-*d*, 620-*e*, and 620-*f* may result in a combined signal represented by the combination of analog beam 605 and refined beams 610. Thus, the combined signal may generate a plurality of refined beams 610, which may overlap with the geographic sector of analog beam 605. In some examples, each refined beam 610 may be a tone-beam that corresponds to a tone and a spatial direction. Each refined beam 610 may also have measurably distinct gain to a receiving UE 115-*e*. In some examples, UE 115-*e* may receive a reference combined signal and may measure a received combined signal with respect to the reference combined signal to measure the gain and/or phase of each refined beam 610. UE 115-*e* may receive analog beam 605 and refined beams 610 from first subarray 615-*a* and second subarray 615-*b* and may utilize the received combined signal to determine a preferred refined beam (e.g., preferred tone-beam) 610-*a* for subsequent transmissions.

In some examples, the phase shifted beam refinement symbol may be transmitted at multiple, different times. For example, as discussed above, a transmitter (e.g., base station 105) may transmit a single phase shifted beam refinement symbol and generate a plurality of refined beams 610 that vary in both tone and direction carried on a single combined signal at a certain time instance. Instead, a transmitter may transmit a series of individual phase combined signals, each of the multiple combined signals carrying phase modulated beam refinement symbols, which may generate multiple refined beams 610 that vary in both time and direction. For example, second subarray 615-*b* may utilize antennas 640 with weights 635 to transmit a first phase shifted beam refinement symbol. The first phase shifted beam refinement symbol may be transmitted at a first point in time in combination with a first analog beam 605, and may generate a first combined signal which carries a first refined beam 610-*a*. Then, second subarray 615-*b* may utilize antennas 640 with weights 635 to transmit a second phase shifted beam refinement symbol in combination with a second analog beam 605 at a second point in time, generating a second combined signal which carries a second refined beam 610-*b*. The procedure may consecutively create third refined beam 610-*c* at a third point in time, refined beam 610-*d* at a fourth point in time, and refined beam 610-*f* at a fifth point in time. Thus, each transmission at a specific time, may correspond to a different direction. In such examples, the transmitter may modulate successive symbols or successive chips on the first and second port and may vary the phase difference. This procedure may emulate a beam sweeping procedure, where each beam is transmitted at a different time in concurrent order to successively sweep through a geographic sector. In response to receiving analog beam 605 and time-specific refined beams 610, UE 115-*e* may utilize the received transmissions to determine a preferred refined beam 610-*a* for subsequent transmissions.

Figure 7:
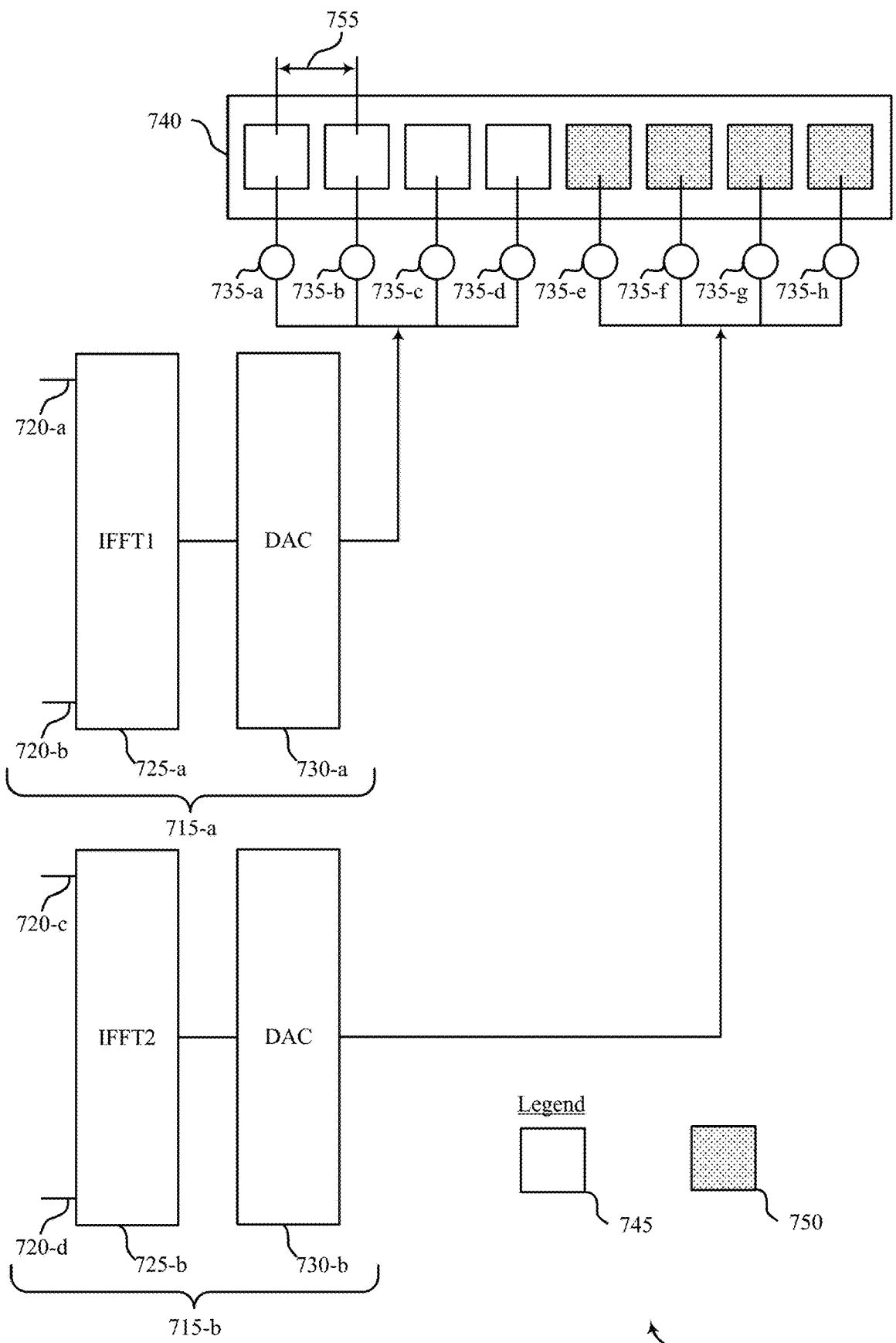
FIGS. 7 through 12 illustrate examples of apparatuses that support beam refinement for mmW systems in accordance with aspects of the present disclosure.

FIG. 7 illustrates an example of a wireless communications system 700 that supports mmW beam refinement in accordance with various aspects of the present disclosure. Wireless communications system 600 may include a base station 105 and a UE 115, which may be examples of the corresponding devices described or may represent aspects of techniques performed by UE 115 or base station 105 as described with reference to FIGS. 1-6. A transmitter (e.g., a base station) may perform the beam refinement procedure utilizing a single antenna panel 840. In some examples, the transmitter may have multiple antenna panels facing multiple directions. Antenna panel 740 may represent an example of various embodiments of an antenna panel on the transmitter.

First subarray 715-*a* and second subarray 715-*b* may represent aspects of sub-arrays regarding FIG. 6. Additionally, a plurality of signals 720, IFFTs 725, DACs 720, and weights 735 may represent similar features with respect to FIG. 6. The first subarray 715-*a* may correspond to a first port, and the second subarray 715-*b* may correspond to a second port. Antennas 745 may be connected to the first port of the transmitter, wherein the signals from antennas 745 may include a beam refinement symbol on an analog beam. Antennas 750 may be connected to the second port of the transmitter, wherein the signals from antennas 750 may include a phase modulated beam refinement symbol. The two signals may be joined in a combined signal when transmitted.

The sub-arrays of both antennas may be arranged in a linear manner, resulting in a single row of antennas. The antennas may be grouped together with antennas 745 being connected to the first port and antennas 750 being connected to the second port. In some examples, antennas 745 may correspond to one or more analog ports, and antennas 750 may correspond to a digital port. By utilizing this configuration, the tone-beams may be scanned in a direction of interest (e.g., an azimuthal direction) with relation to the panel 740. The direction of the scan may travel from left to right. This configuration may be utilized during the beam refinement procedure. The distance 755 between two of the antennas may be less than λ/2, where λ describes the shortest working wavelength of the transmitter. While FIG. 7 shows a first group of antennas connected to the first port and a second group connected to the second port, the antennas may be arranged in different configurations, such that transmissions via a first port may be transmitted via any one of antennas 745 or antennas 750.

Figure 8:
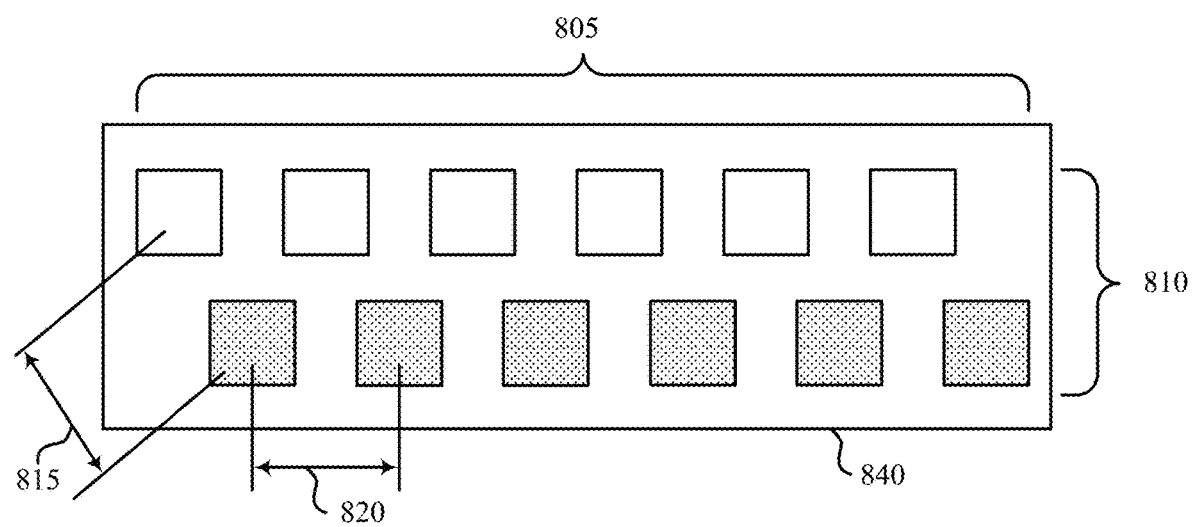
Figure 8:
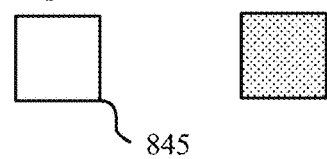
Figure 8:

FIG. 8 illustrates an example of an apparatus 800 that supports beam refinement for mmW systems in accordance with various aspects of the present disclosure. Apparatus 800 may be an example of or may represent aspects of techniques performed by UE 115 or base station 105 as described with reference to FIGS. 1-7. A transmitter (e.g., a base station) may perform the beam refinement procedure utilizing a single antenna panel 840. In some examples, the transmitter may have multiple antenna panels facing multiple directions. Antenna panel 840 may represent an example of various embodiments of an antenna panel on the transmitter similar to FIG. 7.

Antenna panel 840 may include a number of analog ports 805 and a number of digital ports 810. While two digital ports are shown in FIG. 8, the number of digital ports 810 on antenna panel 840 may be greater than or equal to two. The number of digital ports 810 may correspond to the number of different sub-arrays of antennas on antenna panel 840.

The first sub-array of the digital ports 810 may include antennas 845. Antennas 845 may be connected to the first port of the transmitter, wherein the signals from antennas 845 may include a beam refinement symbol via an analog beam. The second sub-array of the digital ports 810 may include antennas 850. Antennas 850 may be connected to the second port of the transmitter, wherein the signals from antennas 850 may include a phase modulated beam refinement symbol. The two signals may be joined in a combined signal when transmitted.

The second sub-array of antennas 850 may be offset from the first sub-array of antennas 845. By utilizing this configuration, the transmitter may generate both the analog beams associated with the first port on antennas 845 and the digital beams associated with the second port on antennas 850 in a direction of interest with relation to the panel 840. The direction of the scan may travel from left to right. The transmitter may utilize this configuration during the beam refinement procedure.

Figure 9:
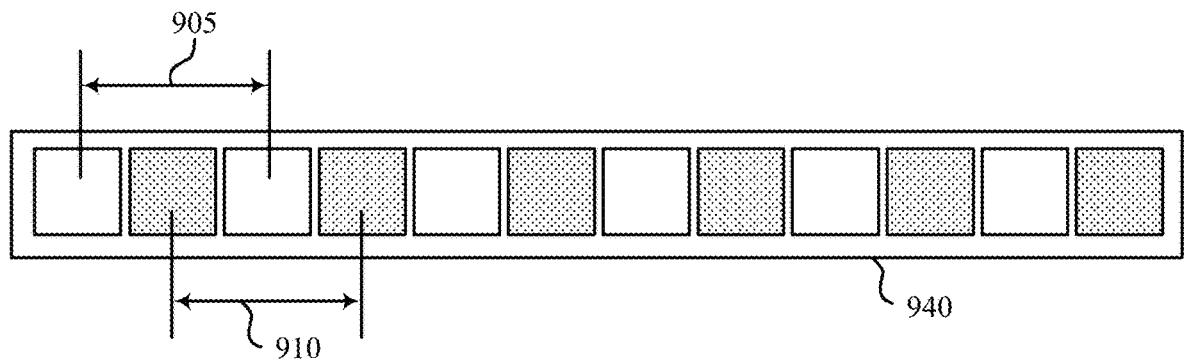
Figure 9:
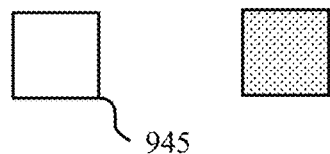
Figure 9:

The diagonal distance 815 between the two sub-arrays may be less than $\lambda/2$, where $\lambda$ describes the shortest working wavelength of the transmitter. Similarly, the horizontal distance 820 may be less than $\lambda/2$. In some examples, distances 815 and 820 may be equal, resulting in a configuration wherein the lines connecting adjacent elements create an equilateral triangle FIG. 9 illustrates an example of an apparatus 900 that supports beam refinement for mmW systems in accordance with various aspects of the present disclosure. Apparatus 900 may be an example of or may represent aspects of techniques performed by UE 115 or base station 105 as described with reference to FIGS. 1-8. A transmitter (e.g., a base station) may perform the beam refinement procedure utilizing a single antenna panel 940. Antenna panel 940 may represent an example of various embodiments of an antenna panel on the transmitter similar to FIG. 7-8.

Antennas 945 may be connected to the first port of the transmitter, wherein the signals from antennas 945 may include a beam refinement symbol on the analog beam. Antennas 950 may be connected to the second port of the transmitter, wherein the signals from antennas 950 may include a phase modulated beam refinement symbol. The two signals may be joined in a combined signal when transmitted.

The sub-arrays of both antennas may be arranged in a linear manner, resulting in a single row of antennas. The antennas may alternate between antennas 945 connected to the first port and antennas 950 connected to the second port, such that an antenna in the row does not correspond to the same port as either of its adjacent antennas. By utilizing this configuration, the tone-beams may be scanned in a direction of interest with relation to the panel 940. The direction of the scan may travel from left to right. This configuration may be utilized during the beam refinement procedure. The distance 905 between two of the antennas 945 may be less than $\lambda/2$, where $\lambda$ describes the shortest working wavelength of the transmitter. Similarly, the distance 910 between two of the antennas 950 may be less than $\lambda/2$.

Figure 10:
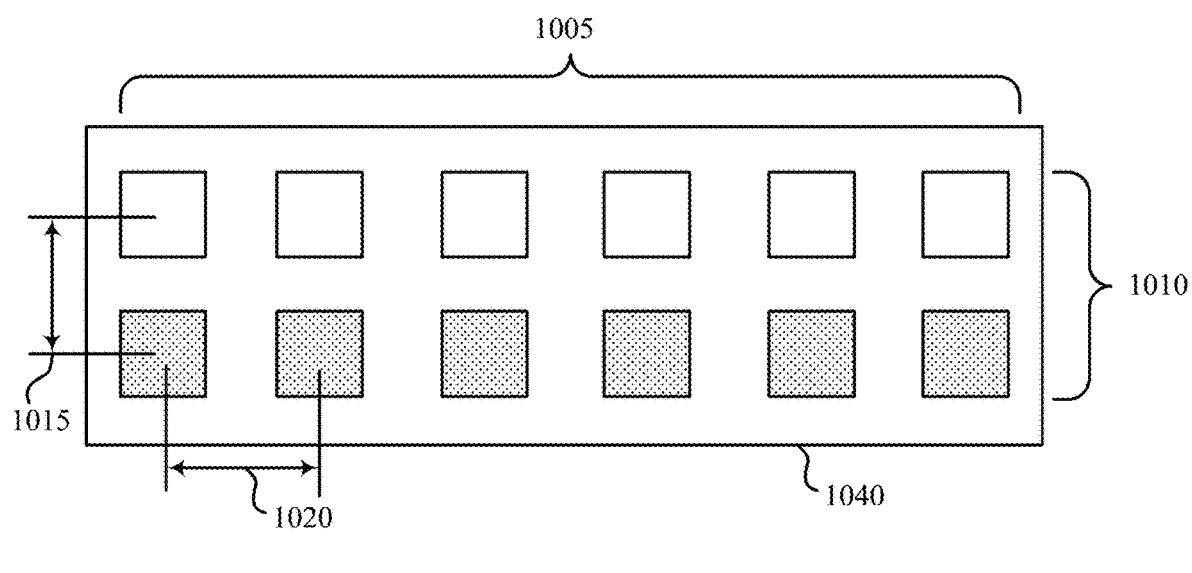
Figure 10:
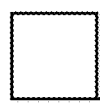
Figure 10:
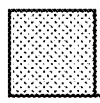

FIG. 10 illustrates an example of an apparatus 1000 that supports beam refinement for mmW systems in accordance with various aspects of the present disclosure. Apparatus 1000 may be an example of or may represent aspects of techniques performed by UE 115 or base station 105 as described with reference to FIGS. 1-9. A transmitter (e.g., a base station) may perform the beam refinement procedure utilizing a single antenna panel 1040. Antenna panel 1040 may represent an example of various embodiments of an antenna panel on the transmitter, similar to FIGS. 7-9.

Antenna panel 1040 may include a number of analog ports 1005 and a number of digital ports 1010. While two digital ports are shown in FIG. 10, the number of digital ports 1010 on antenna panel 1040 may be greater than or equal to two. The number of digital ports 1010 may correspond to the number of different sub-arrays of antennas on antenna panel 1040.

The first sub-array of the digital ports 1010 may include antennas 1045. Antennas 1045 may be connected to the first port of the transmitter, wherein the signals from antennas 1045 may include a beam refinement symbol via an analog beam. The second sub-array of the digital ports 1010 may include antennas 1050. Antennas 1050 may be connected to the second port of the transmitter, wherein the signals from antennas 1050 may include a phase modulated beam refinement symbol. The two signals may be joined in a combined signal when transmitted.

The second sub-array of antennas 1050 may be aligned with and parallel to the first sub-array antennas 1045. By utilizing this configuration, the transmitter may synthesize the tone-beams in elevation and the analog beam gain in a direction of interest with respect to the antenna panel 1040. The direction of the scan may travel from left to right. This configuration may be utilized during the beam refinement procedure. The distance 1015 between the two sub-arrays may be less than $\lambda/2$, where $\lambda$ describes the shortest working wavelength of the transmitter. Similarly, the horizontal distance 1020 may be less than $\lambda/2$.

Figure 11:
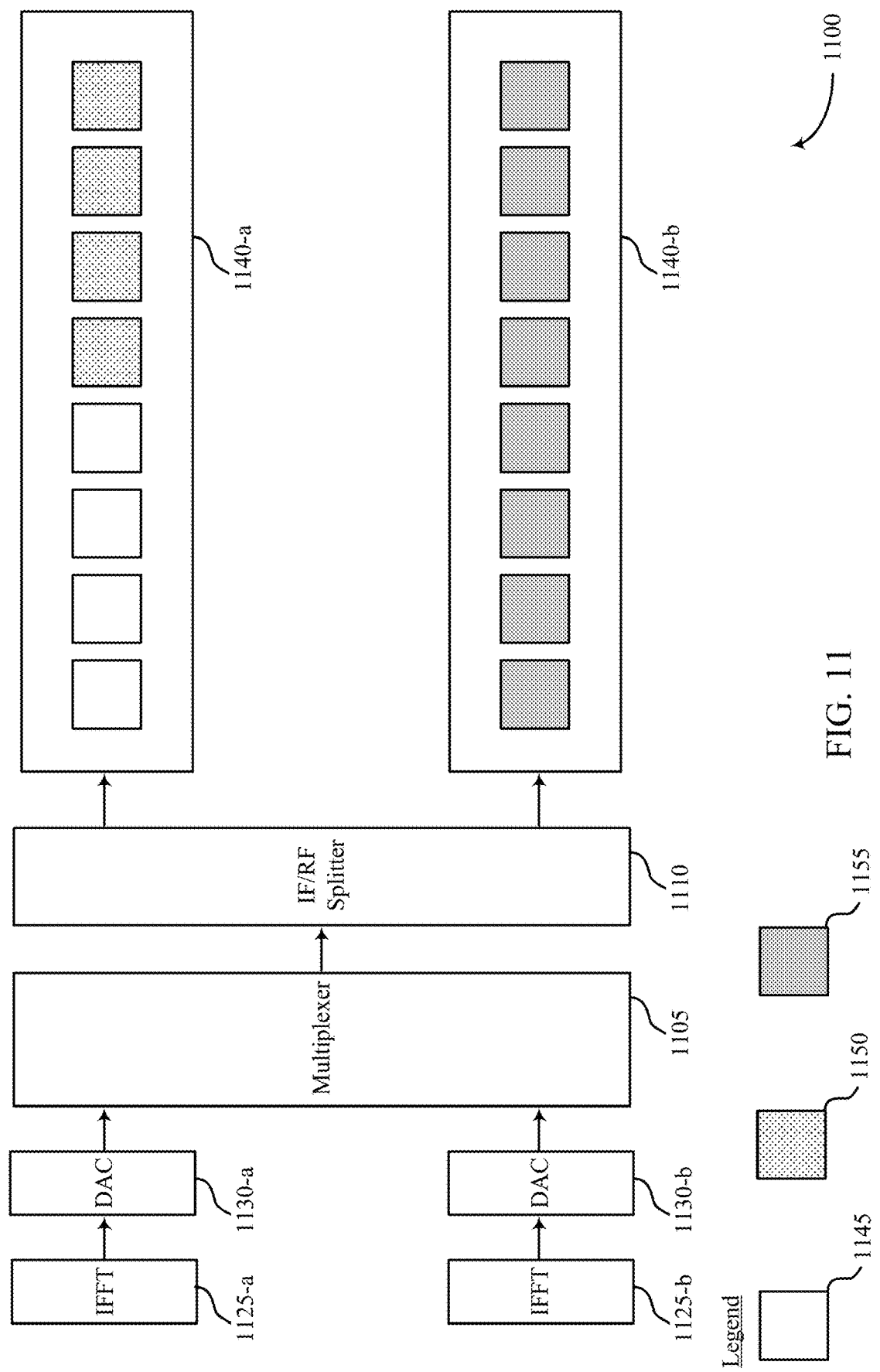

FIG. 11 illustrates an example of an apparatus 1100 that supports beam refinement for mmW systems in accordance with various aspects of the present disclosure. Apparatus 1100 may be an example of or may represent aspects of techniques performed by UE 115 or base station 105 as described with reference to FIGS. 1-10. Antenna panel 1140-a may perform a beam refinement procedure using antennas 1145 and antennas 1150, corresponding to the first and second ports, respectively, of the transmitter (e.g., a base station), as described in FIGS. 7-10. While antenna panels 1140 depict the panel configuration as described in FIG. 7, any of the panel configurations described in FIGS. 7-10 may be utilized for transmitting the beam refinement signals. As antenna panel 1140-a performs the beam refinement procedure, antenna panel 1140-b may include inactive antennas 1155.

An apparatus for performing the beam refinement method (as described above in FIGS. 2-6 and using the hardware implementations illustrated in FIGS. 6-10) may include one or more transmit chains, as described above in FIG. 6. The transmit chain may include IFFT component 1125. IFFT component 1125 may perform an inverse fast Fourier transform on the beam refinement symbol corresponding to the first and second port. IFFT component 1125-a may transform the beam refinement symbol from the first port, and IFFT component 1125-b may transform the phase shifted beam refinement symbol from the second port. DAC 1130-a and DAC 1130-b may convert the signals from the first and second ports, respectively. Multiplexer 1105 may combine the beam refinement symbol from the first port and the phase shifted beam refinement symbol from the second port. intermediate frequency (IF)/radio frequency (RF) splitter 1110 may split the multiplexed signal and direct it to the first and second sub-arrays of antenna panel 1140-a, wherein the first sub-array may include antennas 1145 and the second sub-array may include antennas 1150. The signals from both antennas 1145 and 1150 may be transmitted on a combined signal.

Alternatively, a switching matrix may be utilized to direct both the beam refinement symbol and the phase shifted beam refinement symbol to antenna panel 1140-a, while antenna panel 1140-b remains inactive. The switching matrix may be a front-end component or a back-end component of the first transmit chain and the second transmit chain.

Figure 12:
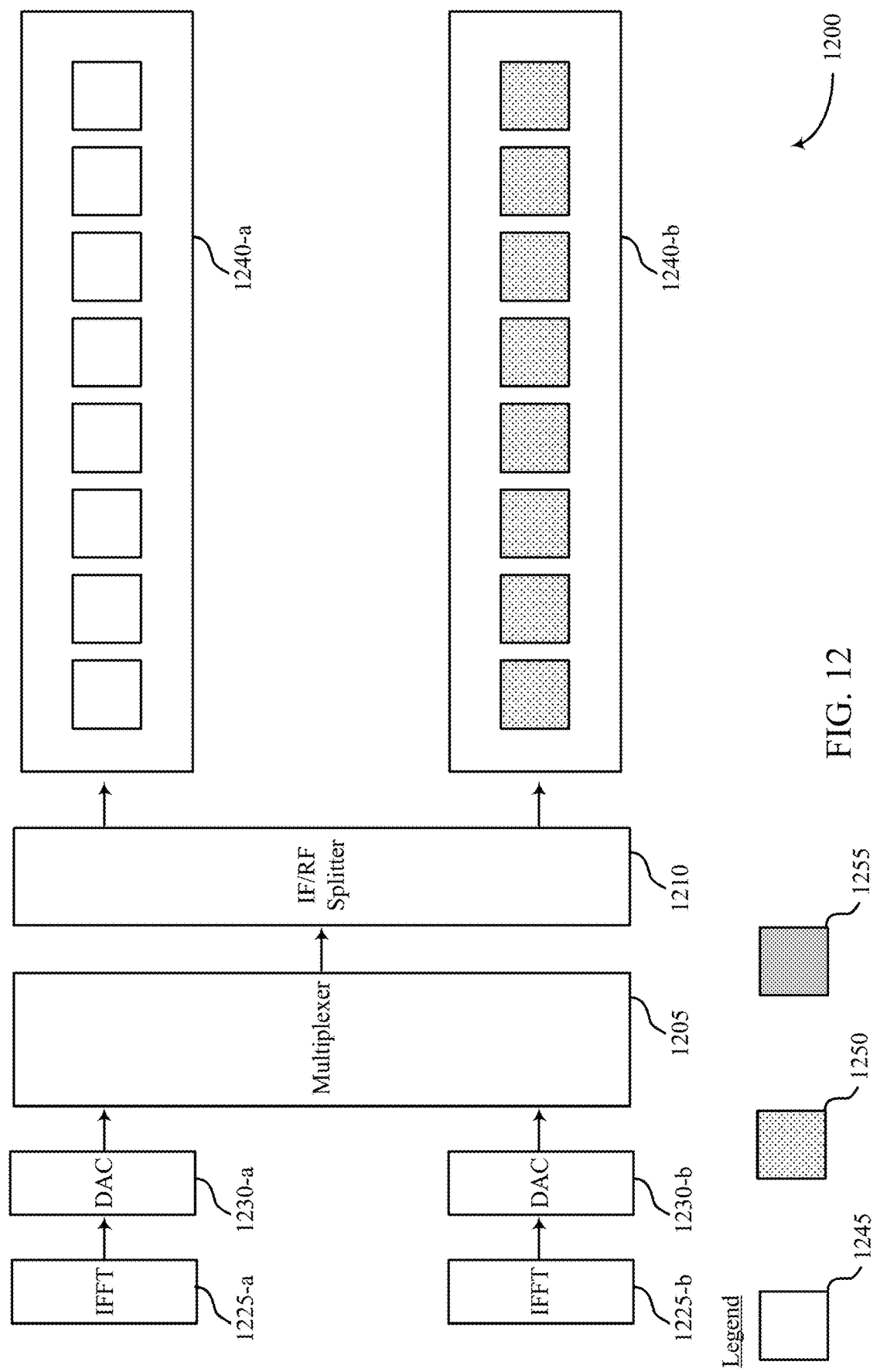

FIG. 12 illustrates an example of an apparatus 1200 that supports beam refinement for mmW systems in accordance with various aspects of the present disclosure. for utilizing multiple antenna panels for the beam refinement procedure as described in FIGS. 2-6. Apparatus 1200 may be an example of or may represent aspects of techniques performed by UE 115 or base station 105 as described with reference to FIGS. 1-11. After the initial beam refinement procedure described in FIG. 11, subsequent transmissions may utilize multiple antenna panels 1240. Antenna panel 1240-a may transmit a beam refinement symbol from the first port on antennas 1245. Antenna panel 1240-b may transmit phase shifted beam refinement symbols from the second port on antennas 1250. While antenna panels 1240 depict the panel configuration as described in FIG. 7, any of the panel configurations described in FIGS. 7-10 may be utilized for transmitting the beam refinement signals.

Similar to FIG. 11, an apparatus for performing the beam refinement method (as described above in FIGS. 2-6 and using the hardware implementations illustrated in FIGS. 6-11) may include one or more transmit chains, as described above in FIG. 6. The transmit chain may include IFFT component 1225 may perform inverse fast Fourier transforms on the signals for each of the ports, and DAC 1230 may convert the signals for each of the ports. Multiplexer 1205 may combine the beam refinement symbol from the first port and the phase shifted beam refinement symbol from the second port. IF/RF splitter 1210 may split the multiplexed signal and direct it to antenna panels 1240-a and 1240-b, wherein antenna panel 1240-a may include antennas 1245 and antenna panel 1240-b may include antennas 1250. Alternatively, a switching matrix may direct the beam refinement symbol to antenna panel 1240-a and the phase shifted beam refinement symbols to antenna panel 1240-b. The signals from both antennas 1145 and 1150 may be transmitted on a combined signal using both antenna panels.

Figure 13:
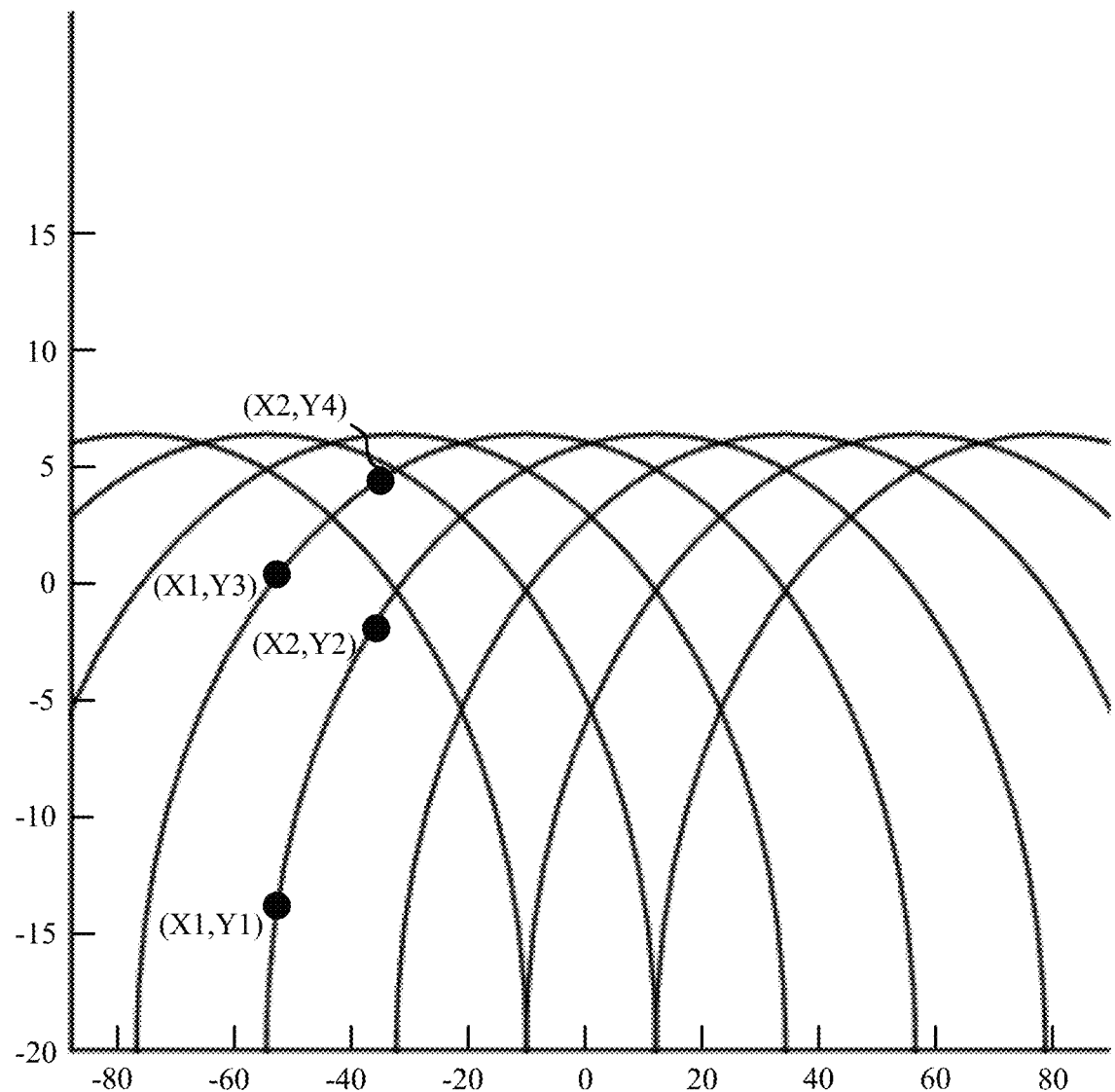
FIG. 13 illustrates an example of a measurement scheme that supports beam refinement for mmW systems in accordance with aspects of the present disclosure.

FIG. 13 is an example of a measurement scheme 1300 that supports beam refinement for mmW systems in accordance with various aspects of the present disclosure. Measurement scheme 1300 may include examples of or may represent aspects of techniques performed by UE 115 or base station 105 as described with reference to FIGS. 1-12.

Once the base station has transmitted a first and second transmission in a beam refinement procedure (as described above in FIGS. 3A and 3B and using the hardware implementations illustrated in FIGS. 6-12), a receiver (e.g., a UE 115) may engage in one or more measurements to identify a preferred tone-beam. The UE 115 may identify a set of tone-beams that have similar maximum gain values when measured at a particular direction. For example, the receiver may receive signals from various directions which may range from negative 80 degrees to positive 80 degrees. A first tone-beam may have a maximum gain value at X1 (e.g., −55 degrees). A second tone-beam may have a maximum gain value at X2 (e.g., −40 degrees). A UE 115 may be located in a region between X1 and X2. However, it may be difficult for UE 115 to determine which of the first tone-beam and the second tone-beam has a higher maximum gain value at the UE's geographic location.

To determine whether the first tone-beam or the second tone-beam will be the preferred tone-beam, the UE 115 may measure the relative gains corresponding to tone-beams that are not the first tone-beam or the second tone-beam. For example, UE 115 may measure non-maximum gain values for a third tone-beam (e.g., the tone-beam having a maximum gain value at about −10 degrees) and a fourth tone-beam (e.g., the tone-beam having a maximum gain value at about 10 degrees). The non-maximum gain values measured at X1 and X2 may be easier to differentiate between than the maximum or near maximum gain values of the first tone-beam and the second tone-beam at X1 and X2. In some examples, a UE 115 may compare these measured values to a set of known values. Based on these measurements and known values, the UE 115 may determine which of the candidate preferred tone-beams will be the preferred tone-beam for subsequent transmissions.

Figure 14:
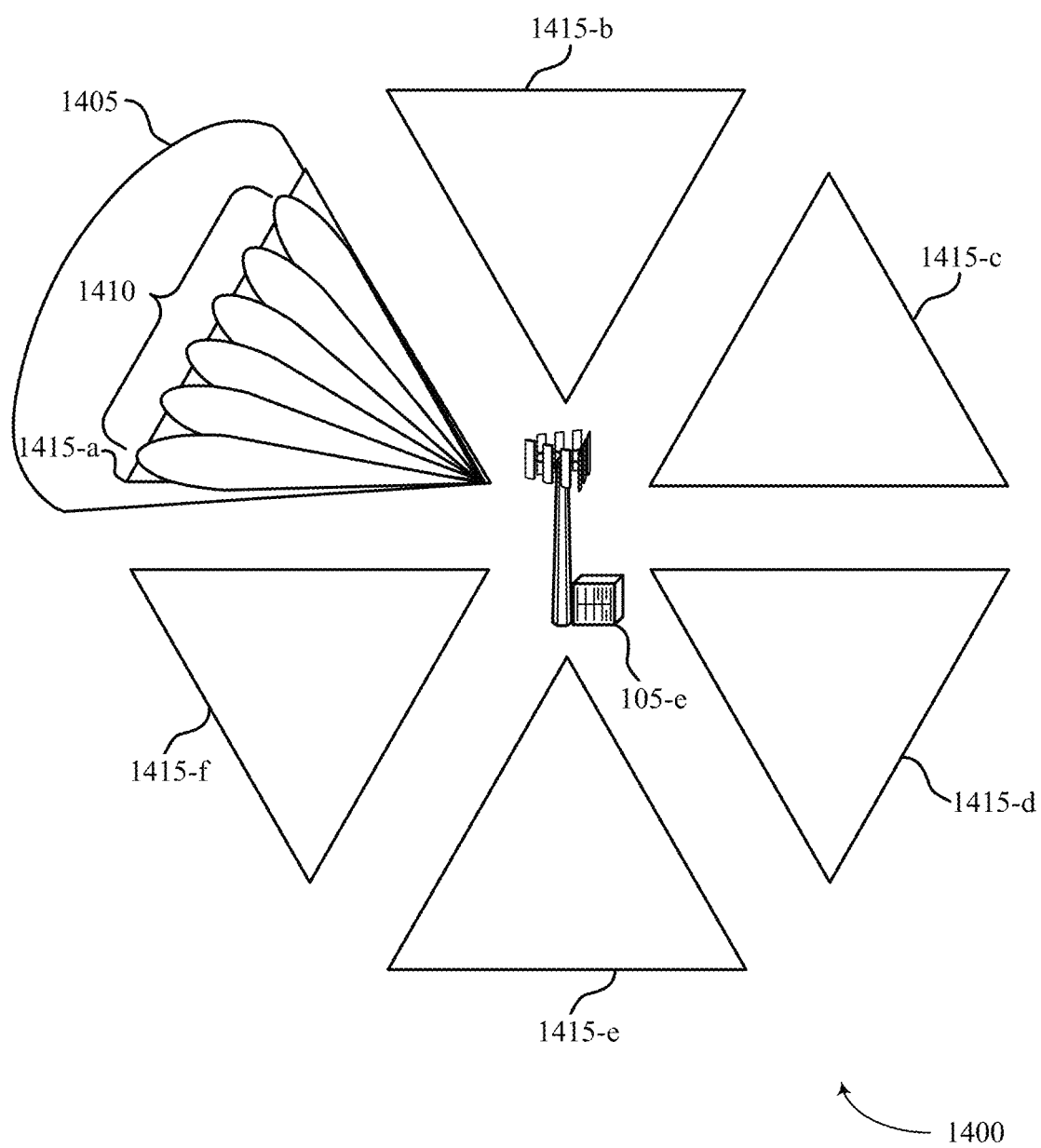
FIG. 14 illustrates an example of a wireless communications system that supports mmW beam refinement in accordance with aspects of the present disclosure.

FIG. 14 illustrates an example of a wireless communications system 1400 that supports beam refinement for mmW systems in accordance with various aspects of the present disclosure. Wireless communications system 1400 may include a base station 105 and a UE 115-e, which may be examples of the corresponding devices described or may represent aspects of techniques performed by UE 115 or base station 105 as described with reference to FIGS. 1-13.

As described in FIGS. 2-6 above, a transmitter (e.g., base station 105-e) may perform an initial search for a target receiver (e.g., a UE 115). The initial search may be a first step in a beam refinement procedure, resulting in the selection of a preferred refined beam for subsequent transmissions. In some examples, base station 105-e may periodically transmit a sector sweep waveform (e.g., a synchronization signal, a reference signal, or a beacon). Base station 105-e may transmit a first sector sweep waveform in first sector 1415-a, a second sector sweep waveform in second sector 1415-b, and so on through all corresponding sectors (e.g., sectors 1415-c, 1415-d, 1415-e, and 1415-f). Sector sweep wave forms may be identified with certain parameters. For example, parameters may include beam identification, base station identification, and panel identification. A UE 115 may receive the sector sweeping wave form and subsequently respond. For example, a UE 115 may respond with association signaling or a random access channel (RACH) signal, or some other feedback signaling. The above described beam sweeping procedure may be included in such sequential sector sweeping. For example, base station 105-e may incorporate into the sector sweep waveform a beam refinement symbol that generates a beam, such as analog beam 1405, via a first port, and a phase shifted beam refinement symbol that generates a plurality of refined beams 1410 via a second port. UE 115 may receive the beam refinement symbol and the phase shifted beam refinement symbol, may select a preferred refined beam (e.g., preferred tone-beam) 1410, and may transmit an indication of the selected preferred refined beam 1410 to base station 105-e. The beam refinement symbol and the phase shifted beam refinement symbol maybe included in sector sweep waveforms for each of the sectors 1415. The analog beam 1405 and refined beams 1410 may be transmitted on a combined signal for each sector 1415.

Alternatively or additionally, base station 105-e may perform sector sweeping in an on-demand mode. That is, a UE 115 may transmit a request an immediate beam-refinement procedure that is separate from a periodic beam refinement procedure corresponding to a sequential sector sweep. In response, base station 105-e may incorporate into the sector sweep waveform a beam refinement symbol that generates an analog beam 1405 via a first port, and a phase shifted beam refinement symbol that generates a plurality of refined beams 1410 via a second port. UE 115 may receive the beam refinement symbol and the phase shifted beam refinement symbol, may select a preferred refined beam 1410, and may transmit an indication of the selected preferred refined beam 1410 to base station 105-*e*.

In some examples, base station 105-*e* may repeat the above described procedure, by transmitting a third transmission which includes a beam refinement symbol via a first port, and a fourth transmission which includes a phase modulated beam refinement symbol via second port. For example, base station 105-*e* may determine that the preferred refined beam 1410 is located on one of the edges of the geographic sector 1415. For example, the preferred beam 1410 may lie on the border of sector 1415-*a* that corresponds to the border of sector 1415-*b*. In such cases, it may be possible that a superior beam for the located receiver might be identified in sector 1415-*b*. Base station 105-*e* may perform the method provided above in the second geographic sector 1415-*b*. In some examples, the transmitter may store the information gained from the initial procedure performed in geographic sector 1415-*a* for use and comparison for future beam refinement procedures. Base station 105-*e* may compare the preferred tone-beam from the first and second transmissions to the preferred refined beam 1410 from the third and fourth transmissions to determine the superior preferred refined beam 1410. Additionally or alternatively, the above described procedure may be incorporated into a standard sector sweep phase. Such sector sweeps may be on demand or periodic. The indication received by the transmitter at each geographic sector may be stored at the transmitter and incorporated into subsequent sector sweeps and subsequent beam refinement procedures.

Figure 15:
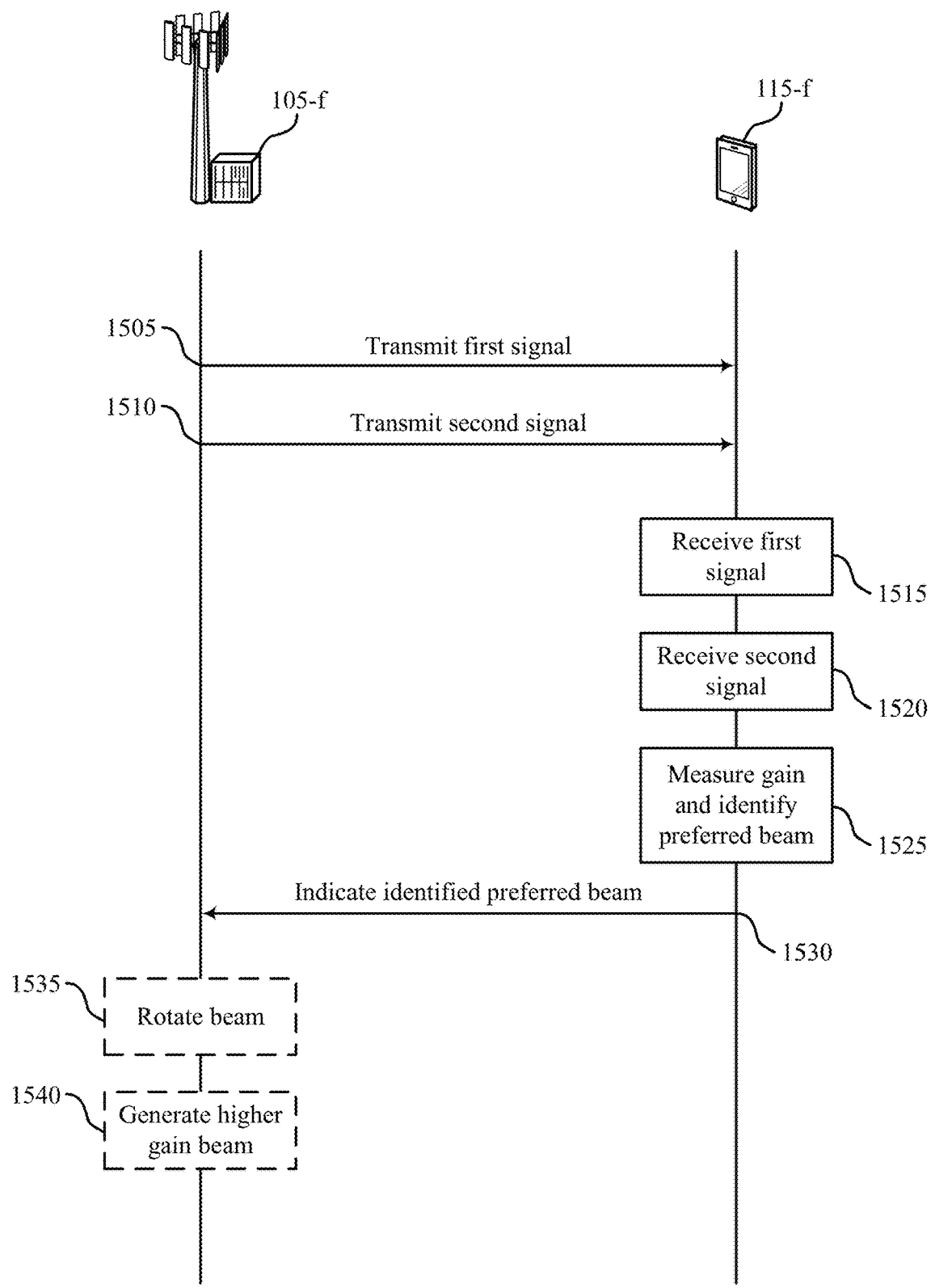
FIG. 15 illustrates an example of a process flow that supports beam refinement for mmW systems in accordance with aspects of the present disclosure.

FIG. 15 illustrates an example of a process flow 1500 that supports beam refinement for mmW systems in accordance with various aspects of the present disclosure. Process flow 1500 may include the transmission of beam refinement symbols, feedback from UE 115-*f*, and adjustments made by base station 105-*f*.

Initially, base station 105-*f* may send a first transmission 1505. The first transmission 1505 may include a first signal corresponding to a symbol (e.g., a beam refinement symbol) sent through a first port, wherein the symbol may be at least a portion of a reference symbol, at least a portion of a control symbol, or at least a portion of a data symbol. The symbol may form a beam to cover a geographic sector. Base station 105-*f* may send the first signal as part of a beam sector sweep. Alternatively, base station 105-*f* may send the first signal in response to a request from the receiver for beam refinement.

Base station 105-*f* may send a second transmission 1510. The second transmission 1510 may include a second signal corresponding to the symbol sent through a second port, wherein the symbol may be modulated with respect to the first signal such that the second signal is digitally beamformed in one or more directions that at least partially overlap the geographic sector formed by the first signal. The second signal may include different tones phase-modulated such that the second signal includes a plurality of tone-beams each corresponding to one of the one or more directions. The tone beams may be phase-modulated or amplitude modulated. The tone-beams may be grouped together through frequency or block interleaving. Alternatively, base station 105-*f* may send the second signal at different times, wherein each of the second signals correspond to the one or more directions. Base station 105-*f* may send the second signal as part of a beam sector sweep. Alternatively or additionally, base station 105-*f* may send the second signal in response to a request from the receiver for beam refinement. Base station 105-*f* may transmit the first and second signals on a combined signal. The combined signal may be located in different frequency bands.

Base station 105-*f* may transmit the combined signal utilizing a single antenna panel that includes the first port and the second port, wherein each port includes the respective transmission signal. In some examples, a second sub-array of antennas corresponding to the second port may be in-line with a first sub-array of antennas corresponding to the first port. Base station 105-*f* may utilize a switching matrix or multiplexing to direct the beam refinement symbols from the first signal and the second signal to the single antenna panel.

Base station 105-*f* may send a third transmission and a fourth transmission with the beam refinement symbols. In some cases, base station 105-*f* may utilize more than two ports for the transmissions. The first signal and the second signal may include additional information, such as a sector identification, a network identification, a panel identification, or other identifying information.

At 1515, UE 115-*f* may receive the first signal from base station 105-*f*. For example, UE 115-*f* may receive the first signal during a sector sweep phase. The first signal may have a gain that is substantially constant across at least a portion of a geographic sector. At 1520, UE 115-*f* may receive the second signal from base station 105-*f* during a sector sweep phase. UE 115-*f* may receive the second signal from one or more directions that at least partially overlap the geographic sector. UE 115-*f* may receive the first signal and the second signal concurrently, where the signals are part of the combined signal. Alternatively, UE 115-*f* may receive multiple second signals at different times, wherein each of the second signals correspond to the one or more directions.

At 1525, UE 115-*f* may measure a gain associated with each signal and identify a preferred refined beam (e.g., preferred tone-beam) for subsequent transmissions based on the measurement. UE 115-*f* may measure the gain of a phase of the combined signal normalized by the phase of a reference combined signal. UE 115-*f* may measure the gain of a subset of tones from the combined signal with the gain of the reference combined signal from base station 105-*f*. UE 115-*f* may determine a set of adjacent tone-beams having maximum gain. UE 115-*f* may compare the relative gains of the tone-beams in the set to determine the preferred refined beam. Additionally, UE 115-*f* may determine the preferred refined beam based at least in part on the orientation of the first and second signal. UE 115-*f* may determine the preferred refined beam based on more than the two signals.

UE 115-*f* may transmit an indication 1530 to base station 105-*f*. Indication 1530 may include an indication of the preferred refined beam. Additionally, indication 1530 may include the gain measurement of 1525 corresponding to the second signal.

At block 1535, base station 105-*f* may rotate the beam covering a geographic sector based at least in part of the indication 1530. Base station 105-*f* may rotate the beam covering a geographic sector in the direction of UE 115-*f*. At block 1540, base station 105-*f* may generate a higher gain beam based at least in part of the indication 1530. Base station 105-*f* may generate the higher gain beam in the direction of UE 115-*f*. Subsequent transmissions from base station 105-*f* may be sent via the rotated beam covering a geographic sector and/or the higher gain beam.

Figure 16:
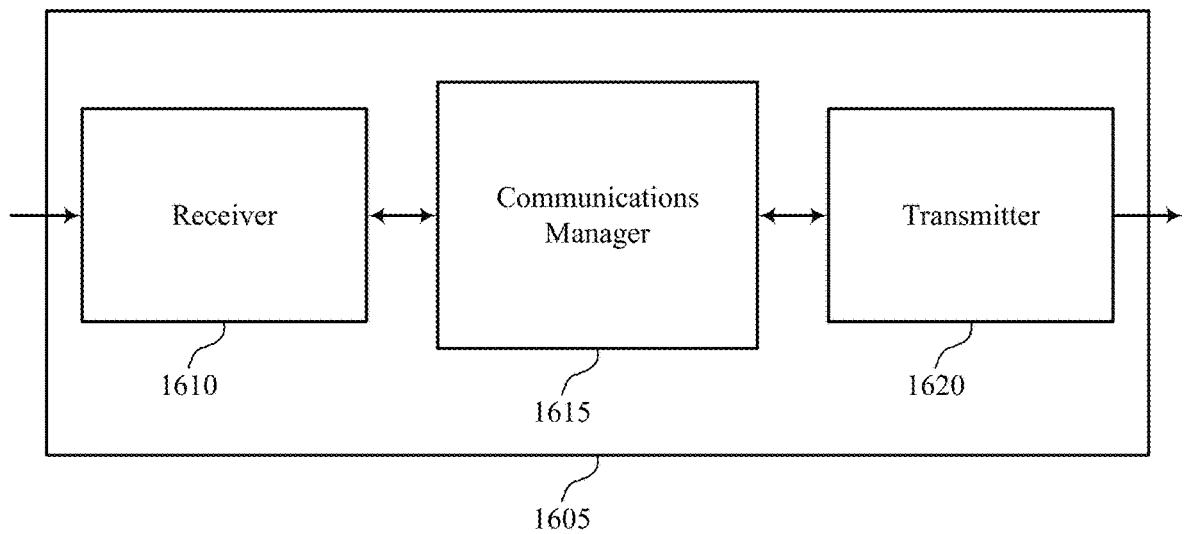
FIGS. 16 through 18 show block diagrams of a device that supports beam refinement for mmW systems in accordance with aspects of the present disclosure.

FIG. 16 shows a block diagram 1600 of a wireless device 1605 that supports beam refinement for mmW systems in accordance with aspects of the present disclosure. Wireless device 1605 may be an example of aspects of a user equipment (UE) 115 or base station 105 as described with reference to FIG. 1. Wireless device 1605 may include receiver 1610, communications manager 1615, and transmitter 1620. Wireless device 1605 may also include a processor. Each of these components may be in communication with one another (e.g., via one or more buses).

Receiver 1610 may receive information such as packets, user data, or control information associated with various information channels (e.g., control channels, data channels, and information related to beam refinement for mmW systems, etc.). Information may be passed on to other components of the device. The receiver 1610 may be an example of aspects of the transceiver 1935 described with reference to FIG. 19. The receiver 1610 may utilize a single antenna or a set of antennas.

Communications manager 1615 may be an example of aspects of the communications manager 1915 described with reference to FIG. 19.

Communications manager 1615 and/or at least some of its various sub-components may be implemented in hardware, software executed by a processor, firmware, or any combination thereof. If implemented in software executed by a processor, the functions of the communications manager 1615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 1615 and/or at least some of its various sub-components may be physically located at various positions, including being distributed such that portions of functions are implemented at different physical locations by one or more physical devices.

In some examples, communications manager 1615 and/or at least some of its various sub-components may be a separate and distinct component in accordance with various aspects of the present disclosure. In other examples, communications manager 1615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 1615 may transmit, using beamforming (e.g., analog beamforming) and a first port, a first signal corresponding to a symbol so as to cover a geographic sector. Communications manager 1615 may further transmit, using analog beamforming and a second port, a second signal corresponding to the symbol, where aspects of the symbol are additionally modulated during the transmitting of the second signal with respect to the transmitting of the first signal such that corresponding aspects of a combined signal of the first signal and second signal are beam-formed in one or more directions that at least partially overlap the geographic sector. Communications manager 1615 may receive an indication from a receiver identifying one or more of the aspects of the combined signal, where the indication is based on measurements of the one or more of the aspects of the combined signal. Communications manager 1615 may then determine a refined beam for subsequent transmissions based on the indication.

The communications manager 1615 may also transmit, using analog beamforming and a first port, a first signal corresponding to a symbol so as to cover a geographic sector. Communications manager 1615 may transmit, using analog beamforming and a second port, a second signal corresponding to the symbol, where aspects of the symbol are additionally modulated during the transmitting of the second signal with respect to the transmitting of the first signal such that corresponding aspects of a combined signal of the first signal and second signal are beam-formed in one or more directions that at least partially overlap the geographic sector. Communications manager 1615 may retransmit the combined signal at different times such that each transmission of the combined signal at different times corresponds to the one of the one or more directions. Communications manager 1615 may receive an indication from a receiver identifying one or more of the aspects of the combined signal, where the indication is based on measurements of the one or more of the aspects of the second signal. Communications manager may then determine a refined beam for subsequent transmissions based on the indication.

The communications manager 1615 may also receive a first signal from a transmitter, the first signal corresponding to a symbol and transmitted so as to cover a geographic sector. Communications manager 1615 may further receive a second signal from the transmitter, the second signal corresponding to the symbol, where aspects of the symbol are additionally modulated during transmission of the second signal with respect to a transmission of the first signal such that corresponding aspects of a combined signal of the first signal and the second signal are beam-formed in one or more directions that at least partially overlap the geographic sector. Communications manager 1615 may measure one or more of the aspects of the combined signal, and determine a refined beam for subsequent transmissions based on the measuring.

The communications manager 1615 may also receive a first signal from a transmitter, the first signal corresponding to a symbol and transmitted so as to cover a geographic sector. Communications manager 1615 may receive a second signal from the transmitter, the second signal corresponding to the symbol, where aspects of the symbol are additionally modulated during transmission of the second signal with respect to a transmission of the first signal such that corresponding aspects of a combined signal of the first signal and the second signal are beam-formed in one or more directions that at least partially overlap the geographic sector. Communications manager 1615 may receive the combined signal at different times such that each transmission of the combined signal at different times corresponds to one of the one or more directions, measure one or more of the aspects of the combined signal, and determine a refined beam for subsequent transmissions based on the measuring.

Transmitter 1620 may transmit signals generated by other components of the device. In some examples, the transmitter 1620 may be collocated with a receiver 1610 in a transceiver module. For example, the transmitter 1620 may be an example of aspects of the transceiver 1935 described with reference to FIG. 19. The transmitter 1620 may utilize a single antenna or a set of antennas.

Figure 17:
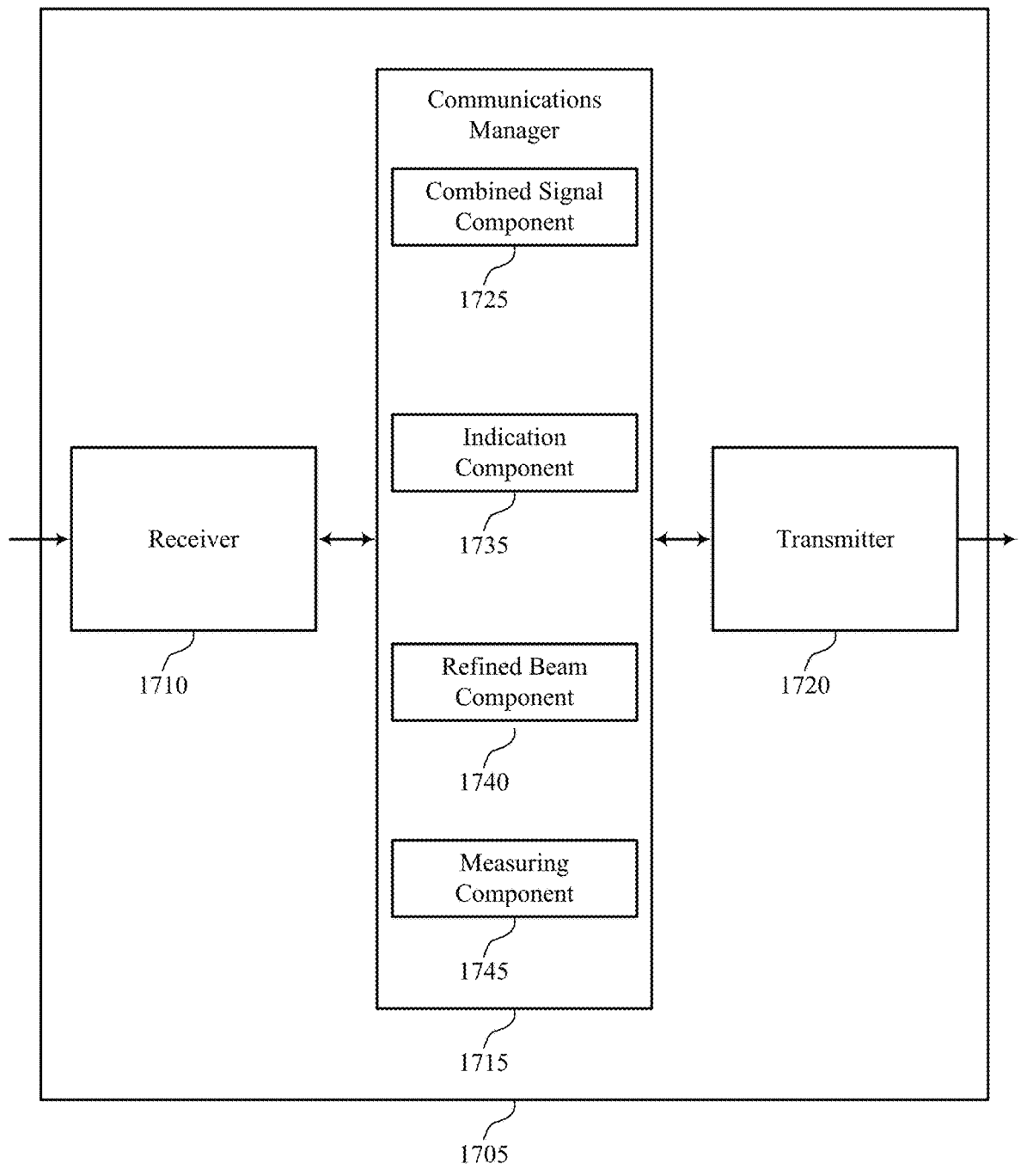

FIG. 17 shows a block diagram 1700 of a wireless device 1705 that supports beam refinement for mmW systems in accordance with aspects of the present disclosure. Wireless device 1705 may be an example of aspects of a wireless device 1605 or a UE 115 or base station 105 as described with reference to FIGS. 1 and 16. Wireless device 1705 may include receiver 1710, communications manager 1715, and transmitter 1720. Wireless device 1705 may also include a processor. Each of these components may be in communication with one another (e.g., via one or more buses).

Wireless device 1705 may act as a transmitter (e.g. base station 105) in some instances. For example, combined signal component 1725, indication component 1735, and refined beam component 1740 may be activated when wireless device 1705 is acts as a transmitter. Wireless device 1705 may also act as a receiver (e.g., UE 115) in some instances. For example, indication component 1735, refined beam component 1740, and measuring component 1745 may be activated when wireless device 1705 acts as a receiver.

Receiver 1710 may receive information such as packets, user data, or control information associated with various information channels (e.g., control channels, data channels, and information related to beam refinement for mmW systems, etc.). Information may be passed on to other components of the device. The receiver 1710 may be an example of aspects of the transceiver 1935 described with reference to FIG. 19. The receiver 1710 may utilize a single antenna or a set of antennas.

Communications manager 1715 may be an example of aspects of the communications manager 1915 described with reference to FIG. 19.

Communications manager 1715 may also include combined signal component 1725, indication component 1735, refined beam component 1740, and measuring component 1745.

In some instances, wireless device 1705 may act as a transmitter. In such cases, combined signal component 1725 may transmit, using beamforming (e.g., analog beamforming) and a first port, a first signal corresponding to a symbol so as to cover a geographic sector. Combined signal component 1725 may transmit, using analog beamforming and a second port, a second signal corresponding to the symbol, where aspects of the symbol are additionally modulated during the transmitting of the second signal with respect to the transmitting of the first signal such that corresponding aspects of a combined signal of the first signal and second signal are beam-formed in one or more directions that at least partially overlap the geographic sector. Combined signal component 1725 may retransmit the combined signal at different times such that each transmission of the combined signal at different times corresponds to the one of the one or more directions.

Additionally, combined signal component 1725 may direct a component of the combined signal in a direction of interest with respect to the single antenna panel. Combined signal component 1725 may transmit the combined signal via a first antenna panel using at least portions of the first transmit chain and the second transmit chain. Combined signal component 1725 may further transmit, in additional signals, the symbol via additional ports, the additional signals being modulated with respect to the first signal such that the additional signals are digitally beam-formed in additional directions that at least partially overlap the geographic sector. The symbol may include a sector identification, a network identification, a panel identification, or combinations thereof, in one or both of the first signal and the second signal.

In some cases, combined signal component 1725 may transmit the combined signal during a sector sweep phase. Combined signal component 1725 may transmit the combined signal in response to a request from the receiver for beam refinement. Combined signal component 1725 may transmit the combined signal corresponding to a second time instance, where aspects of the combined signal transmitted in the second time instance include aspects that are beam-formed in one or more directions.

In some cases, the aspects of the combined signal include the relative amplitude of a subset of tones of the combined signal. In some cases, the aspects of the combined signal include the relative phase of a subset of tones of the combined signal. In some cases, the symbol of the combined signal is included in either the preamble, middle, or tail of respective transmission packets. In some cases, the combined signal is associated with one or more synchronization signals or one or more reference signals of the sector sweep phase. In some cases, the symbol is at least a portion of a reference symbol, at least a portion of a control symbol, or at least a portion of a data symbol. In some cases, the first signal is in a first OFDM symbol, and the second signal is in a second OFDM symbol, where the combined signal includes a set of tone beams each corresponding to one of the one or more directions. In some cases, the beam refinement symbol of the first signal and the beam refinement symbol of the second signal are included in either the preamble, middle, or tail of respective transmission packets. In some cases, the combined signal is associated with one or more synchronization signals or one or more reference signals of the sector sweep phase.

Indication component 1735 may be activated when the wireless device 1705 is acting as a transmitter. Indication component 1735 may receive an indication from a receiver identifying one or more of the aspects of the combined signal, where the indication is based on measurements of the one or more of the aspects of the combined signal. Indication component 1735 may receive a second indication from the receiver identifying one or more aspects of the second combined signal after transmitting a second combined signal, where the second indication is based on measurements of the one or more of the aspects of the second combined signal. Indication component 1735 may receive the indication as part of feedback received from the receiver, determine a refined beam for subsequent transmissions based on the indication. Indication component 1735 may receive an indication from a receiver identifying one or more of the aspects of the combined signal, where the indication is based on measurements of the one or more of the aspects of the second signal.

In some cases, the feedback message is one of an association beamforming training (ABFT) signal, a responder transmit sector sweep (R-TXSS) signal, or a RACH signal. In some cases, the indication is further based on measurements of the one or more of the aspects of the combined signal in reference to corresponding aspects of the reference combined signal. In some cases, the indication includes either a direction to be used by the refined beam or a beam index corresponding to the direction to be used by the refined beam. In some cases, the beam index is defined through either a predetermined table or via a prior message exchange with the receiver. In some cases, the indication includes the measurements of the gain of the combined signal.

In some cases, the feedback received from the receiver is in the form of an ABFT signal, an R-TXSS signal, or a RACH signal. In some cases, the indication is further based on measurements of the one or more of the aspects of the combined signal in reference to corresponding aspects of the reference signal. The beam index may be defined through either a predetermined table or via a prior message exchange with the transmitter. The indication may include measurements of a gain of the combined signal.

When wireless device 1705 is acting as a transmitter, refined beam component 1740 may phase-modulate or amplitude modulate different tones of the second signal such that the combined signal includes a set of tone beams each corresponding to one of the one or more directions. Refined beam component 1740 may determine a refined beam for subsequent transmissions based on an indication received from the receiver. Refined beam component 1740 may group the tone beams of a combined signal so that more than one tone beam corresponds to one of the one or more directions, wherein the grouping may include frequency interleaving the tone beams of a same group or block interleaving the tone beams of a same group. Refined beam component 1740 may determine a refined beam for subsequent transmissions based on the first indication and the second indication. Additionally, refined beam component 1740 may beam-form the refined beam by rotating an analog-formed beam based on the indication, beam-form the refined beam by using digital or analog beam-forming, or combinations thereof, to increase a transmitted gain in a direction of the receiver.

In some cases, the symbol corresponding to the first signal or the second signal is at least a portion of a reference symbol, at least a portion of a control symbol, or at least a portion of a data symbol.

In some instances, wireless device 1705 may act as a receiver. In such instances, combined signal component 1725 may receive the combined signal corresponding to a second time instance, where aspects of the combined signal transmitted in the second time instance includes aspects that are beam-formed in one or more directions. Combined signal component 1725 may receive a first signal from a transmitter, the first signal corresponding to a symbol and transmitted so as to cover a geographic sector. Combined signal component 1725 may further receive a second signal from the transmitter, the second signal corresponding to the symbol, where aspects of the symbol are additionally modulated during transmission of the second signal with respect to a transmission of the first signal such that corresponding aspects of a combined signal of the first signal and the second signal are beam-formed in one or more directions that at least partially overlap the geographic sector. Combined signal component 1725 may receive, from the transmitter, a repeated transmission of the first and second signals resulting in a second combined signal where aspects of the second combined signal are beam-formed in one or more directions that at least partially overlap with a second geographic sector. Combined signal component 1725 may identify a sector identification, a network identification, a panel identification, or combinations thereof, in one or both of the first signal and the second signal. Combined signal component 1725 may receive the combined signal during a sector sweep phase. In some cases, combined signal component 1725 may receive the first signal and the second signal in response to the request. Combined signal component 1725 may receive a second signal from the transmitter, the second signal corresponding to the symbol, where aspects of the symbol are additionally modulated during transmission of the second signal with respect to a transmission of the first signal such that corresponding aspects of a combined signal of the first signal and the second signal are beam-formed in one or more directions that at least partially overlap the geographic sector. Combined signal component 1725 may receive the combined signal at different times such that each transmission of the combined signal at different times corresponds to one of the one or more directions.

In instances where wireless device 1705 acts as a receiver, indication component 1735 may transmit an indication of the refined beam to the transmitter. Indication component 1735 may transmit an indication identifying the different refined beam for subsequent transmissions. Indication component 1735 may transmit an indication of the refined beam to the transmitter, where the indication includes either a direction to be used by the refined beam or a beam index corresponding to the direction to be used by the refined beam. Indication component 1735 may transmit an indication of the refined beam to the transmitter as part of a feedback message.

When wireless device 1705 is acting as a receiver, refined beam component 1740 may transmit a request for beam refinement, refined beam component 1740 may determine a different refined beam for subsequent transmissions based on the measuring of one or more received combined signals. In some cases, determining the refined beam for subsequent transmissions further includes: sensing an orientation of a transmit array transmitting the first signal and the second signal. In some cases, the method further including determining the refined beam based on the orientation of the transmit array.

Measuring component 1745 may be activated when the wireless device 1705 acts as a receiver. Measuring component 1745 may measure one or more of the aspects of the combined signal. Measuring component 1745 may measure an aspect of the combined signal with reference to the reference combined signal includes measuring a gain of the combined signal normalized by the gain of the reference combined signal. Measuring component 1745 may compare the relative gains of the tone beams that are not included in the set with a known set of gain differences, sense the orientation of the transmit array using an accelerometer or a gyroscope, and measure one or more of the aspects of the second combined signal with respect to a reference combined signal. In some cases, measuring the gain of the combined signal normalized by the gain of the reference combined signal includes: determining a set of adjacent tone beams having maximum gain. In some cases, the method further including measuring, for each tone beam in the set, relative gains of tone beams that are not included in the set at directions corresponding to where the tone beams in the set have maximum gain.

Transmitter 1720 may transmit signals generated by other components of the device. In some examples, the transmitter 1720 may be collocated with a receiver 1710 in a transceiver module. For example, the transmitter 1720 may be an example of aspects of the transceiver 1935 described with reference to FIG. 19. The transmitter 1720 may utilize a single antenna or a set of antennas.

Figure 18:
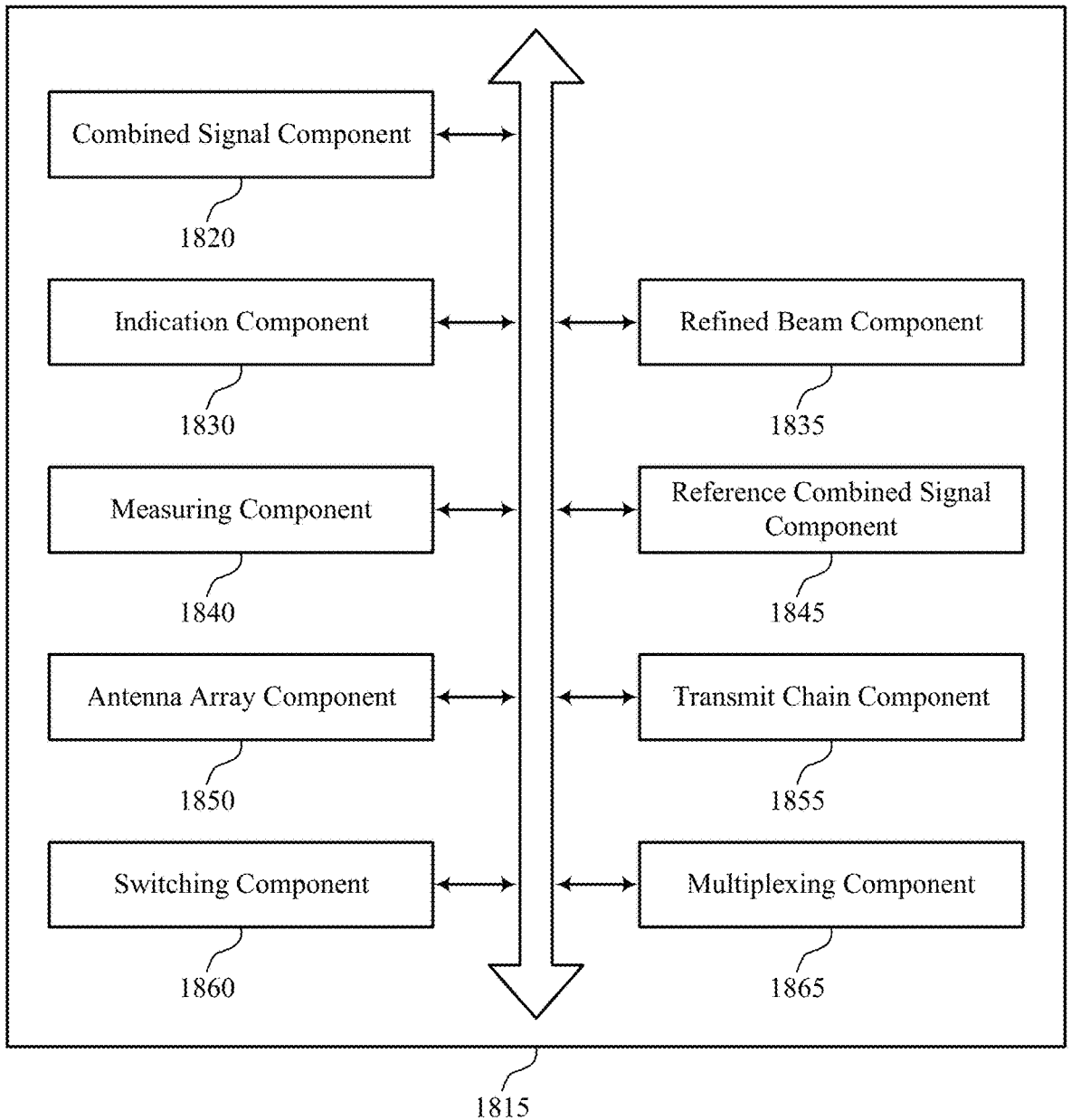

FIG. 18 shows a block diagram 1800 of a communications manager 1815 that supports beam refinement for mmW systems in accordance with aspects of the present disclosure. The communications manager 1815 may be an example of aspects of a communications manager 1615, a communications manager 1715, or a communications manager 1915 described with reference to FIGS. 16, 17, and 19. The communications manager 1815 may include combined signal component 1820, indication component 1830, refined beam component 1835, measuring component 1840, reference combined signal component 1845, antenna array component 1850, transmit chain component 1855, switching component 1860, and multiplexing component 1865. Each of these modules may communicate, directly or indirectly, with one another (e.g., via one or more buses). Communications manager 1815 may be active as part of a transmitter (e.g. base station 105) in some instances. In such cases, combined signal component 1820, indication component 1830, refined beam component 1835, reference combined signal component 1845, antenna array component 1850, transmit chain component 1855, switching component 1860, and multiplexing component 1865 may be used when communications manager 1815 is active as a part of a transmitter. Alternatively, communications manager 1815 may be active as a part of a receiver. In such cases, combined signal component 1820, indication component 1830, refined beam component 1835, and measuring component 1840, may be used when communications manager 1815 is active as a part of a receiver.

In some instances, communications manager 1815 may be used as part of a transmitter. In such instances, combined signal component 1820 may transmit, using beamforming (e.g., analog beamforming) and a first port, a first signal corresponding to a symbol so as to cover a geographic sector. Combined signal component 1820 may direct a component of the combined signal in a direction of interest with respect to a single antenna panel and transmit the combined signal via a first antenna panel using at least portions of the first transmit chain and the second transmit chain. Combined signal component 1820 may transmit, in additional signals, the symbol via additional ports, the additional signals being modulated with respect to the first signal such that the additional signals are digitally beamformed in additional directions that at least partially overlap the geographic sector. Combined signal component 1820 may include a sector identification, a network identification, a panel identification, or combinations thereof, in one or both of the first signal and the second signal.

Combined signal component 1820 may transmit the combined signal during a sector sweep phase. Combined signal component 1820 may transmit the combined signal in response to a request from the receiver for beam refinement. Additionally, combined signal component 1820 may transmit, using analog beamforming and a second port, a second signal corresponding to the symbol, where aspects of the symbol are additionally modulated or amplitude modulated during the transmitting of the second signal with respect to the transmitting of the first signal such that corresponding aspects of a combined signal of the first signal and second signal are beam-formed in one or more directions that at least partially overlap the geographic sector. Alternatively, the combined signal is retransmitted at different times such that each transmission of the combined signal at different times corresponds to the one of the one or more directions.

Combined signal component 1820 may transmit the combined signal corresponding to a second time instance, where aspects of the combined signal transmitted in the second time instance include aspects that are beam-formed in one or more directions. In some cases, the aspects of the combined signal include the relative amplitude or the relative phase of a subset of tones of the combined signal. In some cases, the symbol of the combined signal is included in either the preamble, middle, or tail of respective transmission packets. In some cases, the combined signal is associated with one or more synchronization signals or one or more reference signals of the sector sweep phase. In some cases, the symbol is at least a portion of a reference symbol, at least a portion of a control symbol, or at least a portion of a data symbol. In some cases, the first signal is in a first OFDM symbol, and the second signal is in a second OFDM symbol, where the combined signal includes a set of tone beams each corresponding to one of the one or more directions. In some cases, the beam refinement symbol of the first signal and the beam refinement symbol of the second signal are included in either the preamble, middle, or tail of respective transmission packets. In some cases, the combined signal is associated with one or more synchronization signals or one or more reference signals of the sector sweep phase.

When communications manager 1815 is active as a part of a transmitter, indication component 1830 may receive an indication from a receiver identifying one or more of the aspects of the combined signal, where the indication is based on measurements of the one or more of the aspects of the combined signal. Indication component 1830 may receive a second indication from the receiver identifying one or more aspects of the second combined signal, where the second indication is based on measurements of the one or more of the aspects of the second combined signal, receive the indication as part of feedback received from the receiver. Indication component 1830 may receive an indication from a receiver identifying one or more of the aspects of the combined signal, where the indication is based on measurements of the one or more of the aspects of the second signal.

In some cases, the feedback message is one of an ABFT signal, an R-TXSS signal, or a RACH signal. In some cases, the indication is further based on measurements of the one or more of the aspects of the combined signal in reference to corresponding aspects of the reference combined signal. In some cases, the indication includes either a direction to be used by the refined beam or a beam index corresponding to the direction to be used by the refined beam. In some cases, the beam index is defined through either a predetermined table or via a prior message exchange with the receiver. In some cases, the indication includes the measurements of the gain of the combined signal.

In some cases, the feedback received from the receiver is in the form of an ABFT signal, an R-TXSS signal, or a RACH signal. In some cases, the indication is further based on measurements of the one or more of the aspects of the combined signal in reference to corresponding aspects of the reference signal. In some cases, the beam index is defined through either a predetermined table or via a prior message exchange with the transmitter. In some cases, the indication includes measurements of a gain of the combined signal.

When communications manager 1815 is active as a part of a transmitter, refined beam component 1835 may phase-modulate different tones of the second signal such that the combined signal includes a set of tone beams each corresponding to one of the one or more directions. Refined beam component 1835 may determine a refined beam for subsequent transmissions based on a received indication, group the tone beams so that more than one tone beam corresponds to one of the one or more directions, wherein the grouping may include frequency interleaving the tone beams of a same group or block interleaving the tone beams of a same group. Refined beam component 1835 may determine a refined beam for subsequent transmissions based on a first indication and a second indication. Refined beam component 1835 may beam-form the refined beam by rotating an analog-formed beam based on the indication or beam-form the refined beam by using digital or analog beam-forming, or combinations thereof, to increase a transmitted gain in a direction of the receiver. Refined beam component 1835 may amplitude modulate different tones of the second signal such that the combined signal includes a set of tone beams each corresponding to one of the one or more directions. Refined beam component 1835 may transmit a request for beam refinement. In some cases, the symbol is at least a portion of a reference symbol, at least a portion of a control symbol, or at least a portion of a data symbol.

In instances where communications manager 1815 acts as a transmitter, reference combined signal component 1845 may transmit a reference combined signal corresponding to a first time instance that includes a reference modulation applied to the second signal transmitted by the second port, with respect to the first signal transmitted by the first port, transmit the combined signal corresponding to a second time instance, where aspects of the combined signal transmitted in the second time instance include aspects that are beam-formed in one or more directions. Reference combined signal component 1845 may repeat transmission of the first and second signals resulting in a second combined signal, where aspects of the second combined signal are beam-formed in one or more directions that at least partially overlap with a second geographic sector, and receive a reference combined signal corresponding to a first time instance that includes a reference modulation applied to the second signal transmitted by the second port, with respect to the first signal transmitted by the first port.

When communications manager 1815 acts as part of a transmitter, antenna array component 1850 may transmit the combined signal via a single antenna panel that includes the first port and the second port and transmit subsequent signals using the refined beam via multi-layer transmissions using both the first antenna panel and the second antenna panel. In some cases, a sub-array of the second port is in-line with a sub-array of the first port.

Transmit chain component 1855 may process the symbol of the first signal using at least a portion of a first transmit chain and process the symbol of the second signal using at least a portion of a second transmit chain.

Switching component 1860 may direct the symbol of the second signal to the first antenna panel via a switching matrix.

Multiplexing component 1865 may direct the symbol of the second signal to the first antenna panel by multiplexing the symbol of the second signal with the symbol of the first signal into a single stream directed to the first antenna panel.

In some instances, communications manager 1820 may act as a receiver. In such instances, combined signal component 1820 may receive the combined signal corresponding to a first time instance, and a combined signal corresponding to a second time instance, where aspects of the combined signal transmitted in the second time instance includes aspects that are beam-formed in one or more directions. Combined signal component 1820 may receive a first signal from a transmitter, the first signal corresponding to a symbol and transmitted so as to cover a geographic sector. Combined signal component 1820 may further receive a second signal from the transmitter, the second signal corresponding to the symbol, where aspects of the symbol are additionally modulated during transmission of the second signal with respect to a transmission of the first signal such that corresponding aspects of a combined signal of the first signal and the second signal are beam-formed in one or more directions that at least partially overlap the geographic sector. Combined signal component 1820 may receive, from the transmitter, a repeated transmission of the first and second signals resulting in a second combined signal where aspects of the second combined signal are beam-formed in one or more directions that at least partially overlap with a second geographic sector. Combined signal component 1820 may identify a sector identification, a network identification, a panel identification, or combinations thereof, in one or both of the first signal and the second signal.

Combined signal component 1820 may receive the combined signal during a sector sweep phase, wherein combined signal component 1820 may receive the first signal and the second signal in response to a request. Combined signal component 1820 may receive a first signal and a second signal from the transmitter, the second signal corresponding to the symbol, where aspects of the symbol are additionally modulated during transmission of the second signal with respect to a transmission of the first signal such that corresponding aspects of a combined signal of the first signal and the second signal are beam-formed in one or more directions that at least partially overlap the geographic sector. The combined signal is received at different times such that each transmission of the combined signal at different times corresponds to one of the one or more directions.

In cases where communications manager 1815 is active as a part of a receiver, indication component 1830 may determine a refined beam for subsequent transmissions based on the indication and transmit an indication of the refined beam to the transmitter. Indication component 1830 may transmit an indication identifying the different refined beam for subsequent transmissions. Indication component 1830 may transmit an indication of the refined beam to the transmitter, where the indication includes either a direction to be used by the refined beam or a beam index corresponding to the direction to be used by the refined beam. Indication component 1830 may transmit an indication of the refined beam to the transmitter as part of a feedback message.

When communications manager 1815 acts as a part of a receiver, refined beam component 1835 may determine a refined beam or a different refined beam for subsequent transmissions based on the measuring of received combined signals. In some cases, determining the refined beam for subsequent transmissions further includes: sensing an orientation of a transmit array transmitting the first signal and the second signal. In some cases, the method further including determining the refined beam based on the orientation of the transmit array.

When acting as part of a receiver, measuring component 1840 may measure one or more of the aspects of the combined signal, measure an aspect of the combined signal with reference to the reference combined signal includes measuring a gain of the combined signal normalized by the gain of the reference combined signal, compare the relative gains of the tone beams that are not included in the set with a known set of gain differences, sense the orientation of the transmit array using an accelerometer or a gyroscope, and measure one or more of the aspects of the second combined signal with respect to a reference combined signal. In some cases, measuring the gain of the combined signal normalized by the gain of the reference combined signal includes: determining a set of adjacent tone beams having maximum gain. In some cases, the method further including measuring, for each tone beam in the set, relative gains of tone beams that are not included in the set at directions corresponding to where the tone beams in the set have maximum gain.

Figure 19:
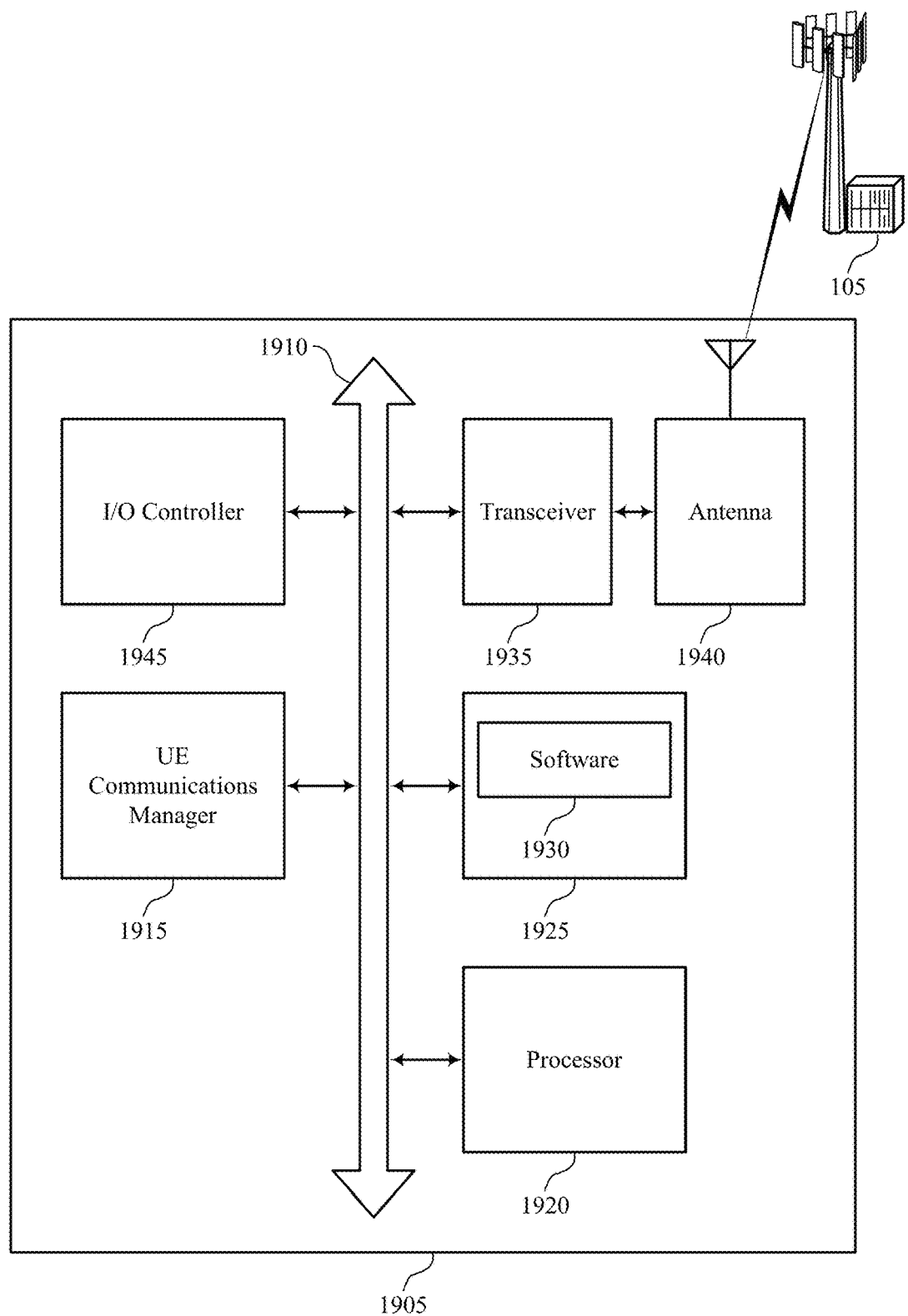
FIG. 19 illustrates a block diagram of a system including a UE that supports mmW beam refinement in accordance with aspects of the present disclosure.

FIG. 19 shows a diagram of a system 1900 including a device 1905 that supports beam refinement for mmW systems in accordance with aspects of the present disclosure. Device 1905 may be an example of or include the components of wireless device 1605, wireless device 1705, or a UE 115 as described above, e.g., with reference to FIGS. 1, 16 and 17. Device 1905 may include components for bi-directional voice and data communications including components for transmitting and receiving communications, including UE communications manager 1915, processor 1920, memory 1925, software 1930, transceiver 1935, antenna 1940, and I/O controller 1945. These components may be in electronic communication via one or more busses (e.g., bus 1910). Device 1905 may communicate wirelessly with one or more base stations 105.

Processor 1920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1920 may be configured to operate a memory array using a memory controller. In other cases, a memory controller may be integrated into processor 1920. Processor 1920 may be configured to execute computer-readable instructions stored in a memory to perform various functions (e.g., functions or tasks supporting beam refinement for mmW systems).

Memory 1925 may include random access memory (RAM) and read only memory (ROM). The memory 1925 may store computer-readable, computer-executable software 1930 including instructions that, when executed, cause the processor to perform various functions described herein. In some cases, the memory 1925 may contain, among other things, a basic input/output system (BIOS) which may control basic hardware and/or software operation such as the interaction with peripheral components or devices.

Software 1930 may include code to implement aspects of the present disclosure, including code to support beam refinement for mmW systems. Software 1930 may be stored in a non-transitory computer-readable medium such as system memory or other memory. In some cases, the software 1930 may not be directly executable by the processor but may cause a computer (e.g., when compiled and executed) to perform functions described herein.

Transceiver 1935 may communicate bi-directionally, via one or more antennas, wired, or wireless links as described above. For example, the transceiver 1935 may represent a wireless transceiver and may communicate bi-directionally with another wireless transceiver. The transceiver 1935 may also include a modem to modulate the packets and provide the modulated packets to the antennas for transmission, and to demodulate packets received from the antennas.

In some cases, the wireless device may include a single antenna 1940. However, in some cases the device may have more than one antenna 1940, which may be capable of concurrently transmitting or receiving multiple wireless transmissions.

I/O controller 1945 may manage input and output signals for device 1905. I/O controller 1945 may also manage peripherals not integrated into device 1905. In some cases, I/O controller 1945 may represent a physical connection or port to an external peripheral. In some cases, I/O controller 1945 may utilize an operating system such as iOS®, ANDROID®, MS-DOS®, MS-WINDOWS®, OS/2®, UNIX®, LINUX®, or another known operating system. In other cases, I/O controller 1945 may represent or interact with a modem, a keyboard, a mouse, a touchscreen, or a similar device. In some cases, I/O controller 1945 may be implemented as part of a processor. In some cases, a user may interact with device 1905 via I/O controller 1945 or via hardware components controlled by I/O controller 1945.

Figure 20:
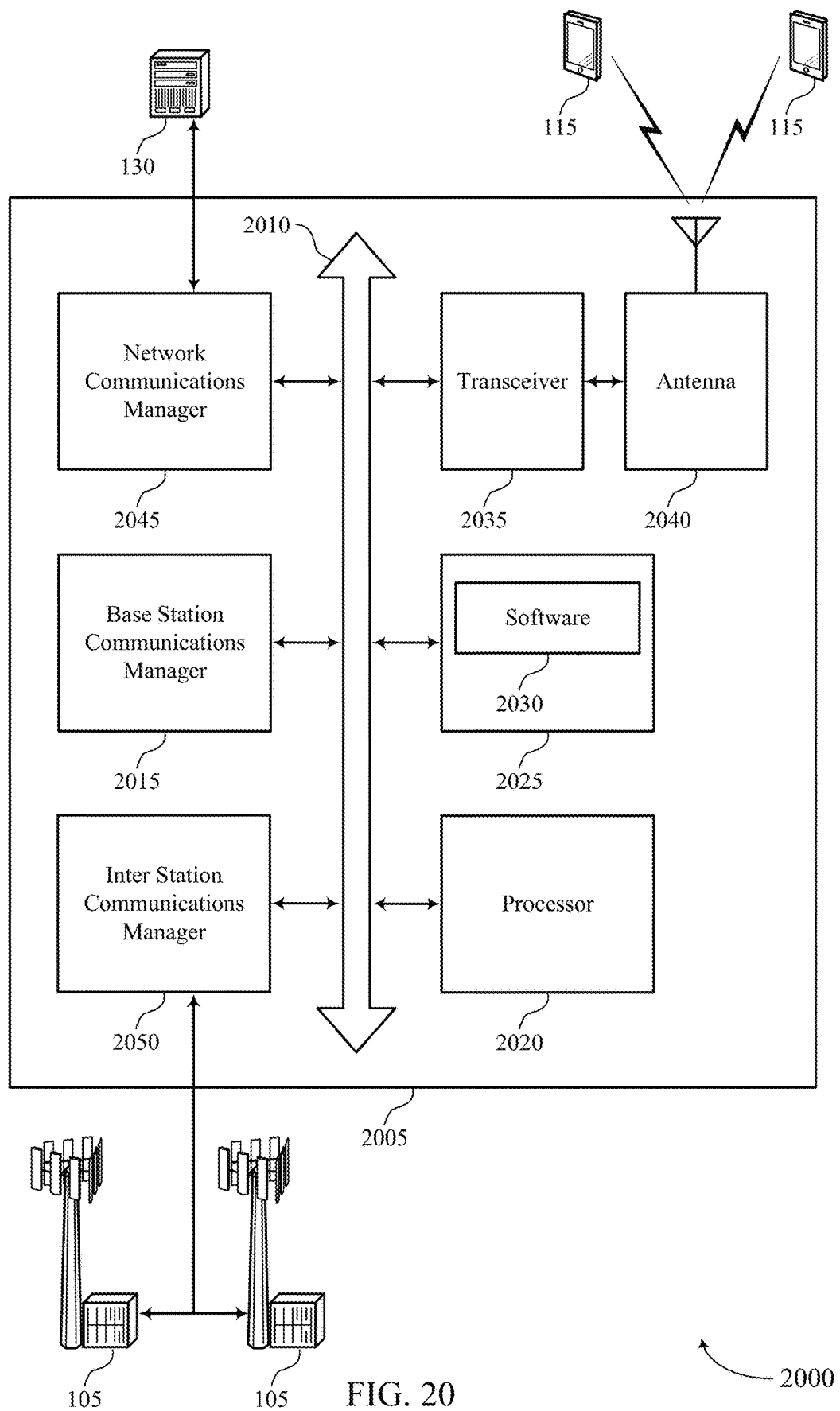
FIG. 20 illustrates a block diagram of a system including a base station that supports mmW beam refinement in accordance with aspects of the present disclosure.

FIG. 20 shows a diagram of a system 2000 including a device 2005 that supports beam refinement for mmW systems in accordance with aspects of the present disclosure. Device 2005 may be an example of or include the components of wireless device 1705, wireless device 1805, or a base station 105 as described above, e.g., with reference to FIGS. 1, 17 and 18. Device 2005 may include components for bi-directional voice and data communications including components for transmitting and receiving communications, including base station communications manager 2015, processor 2020, memory 2025, software 2030, transceiver 2035, antenna 2040, network communications manager 2045, and inter-station communications manager 2050. These components may be in electronic communication via one or more busses (e.g., bus 2010). Device 2005 may communicate wirelessly with one or more UEs 115.

Processor 2020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 2020 may be configured to operate a memory array using a memory controller. In other cases, a memory controller may be integrated into processor 2020. Processor 2020 may be configured to execute computer-readable instructions stored in a memory to perform various functions (e.g., functions or tasks supporting beam refinement for mmW systems).

Memory 2025 may include RAM and ROM. The memory 2025 may store computer-readable, computer-executable software 2030 including instructions that, when executed, cause the processor to perform various functions described herein. In some cases, the memory 2025 may contain, among other things, a BIOS which may control basic hardware and/or software operation such as the interaction with peripheral components or devices.

Software 2030 may include code to implement aspects of the present disclosure, including code to support beam refinement for mmW systems. Software 2030 may be stored in a non-transitory computer-readable medium such as system memory or other memory. In some cases, the software 2030 may not be directly executable by the processor but may cause a computer (e.g., when compiled and executed) to perform functions described herein.

Transceiver 2035 may communicate bi-directionally, via one or more antennas, wired, or wireless links as described above. For example, the transceiver 2035 may represent a wireless transceiver and may communicate bi-directionally with another wireless transceiver. The transceiver 2035 may also include a modem to modulate the packets and provide the modulated packets to the antennas for transmission, and to demodulate packets received from the antennas.

In some cases, the wireless device may include a single antenna 2040. However, in some cases the device may have more than one antenna 2040, which may be capable of concurrently transmitting or receiving multiple wireless transmissions.

Network communications manager 2045 may manage communications with the core network (e.g., via one or more wired backhaul links). For example, the network communications manager 2045 may manage the transfer of data communications for client devices, such as one or more UEs 115.

Inter-station communications manager 2050 may manage communications with other base station 105, and may include a controller or scheduler for controlling communications with UEs 115 in cooperation with other base stations 105. For example, the inter-station communications manager 2050 may coordinate scheduling for transmissions to UEs 115 for various interference mitigation techniques such as beamforming or joint transmission. In some examples, inter-station communications manager 2050 may provide an X2 interface within an Long Term Evolution (LTE)/LTE-A wireless communication network technology to provide communication between base stations 105.

Figure 21:
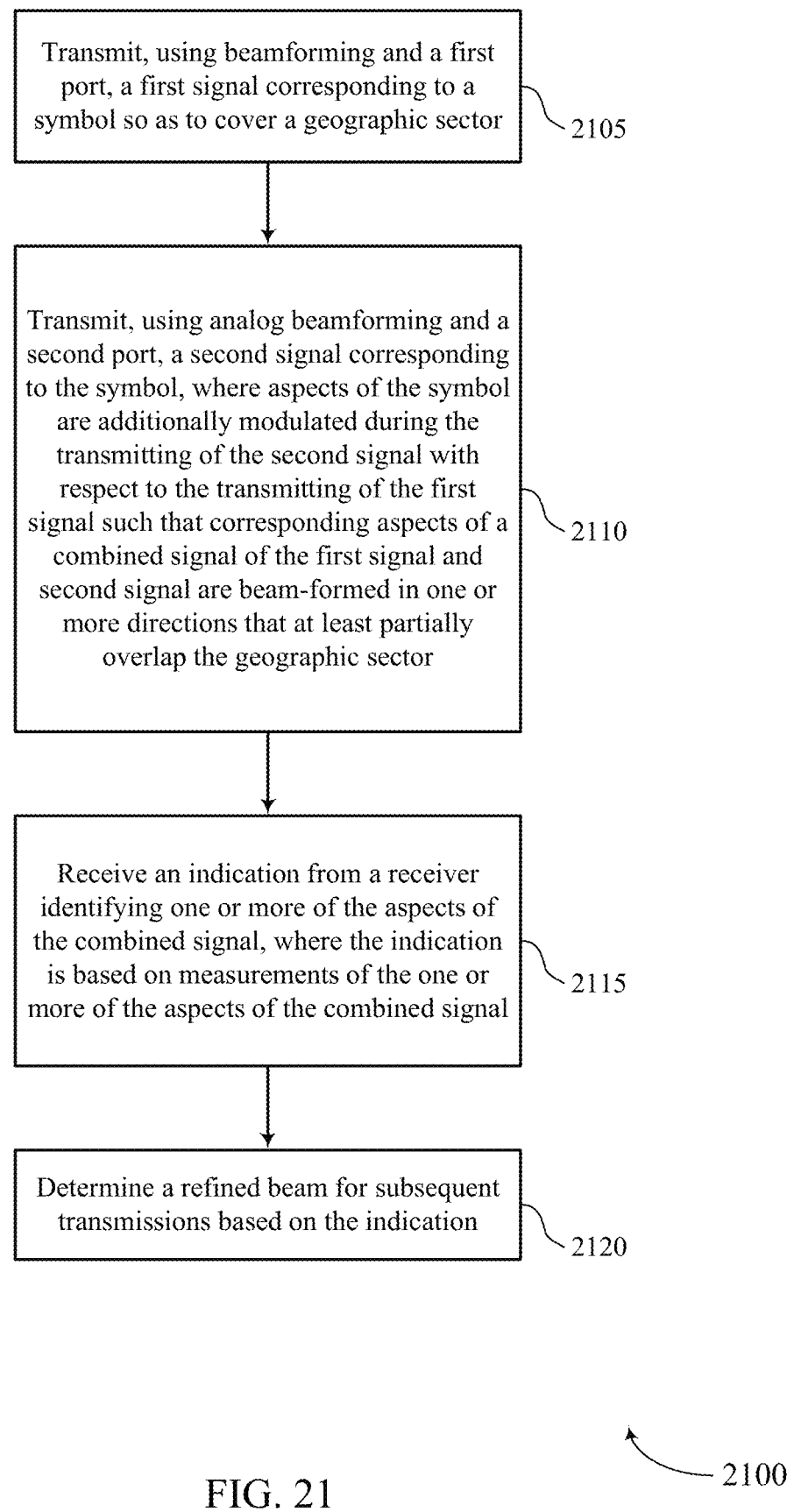
FIGS. 21 through 24 illustrate methods for beam refinement for mmW systems in accordance with aspects of the present disclosure.

FIG. 21 shows a flowchart illustrating a method 2100 for beam refinement for mmW systems in accordance with aspects of the present disclosure. The operations of method 2100 may be implemented by a UE 115 or base station 105 or its components as described herein. For example, the operations of method 2100 may be performed by a communications manager as described with reference to FIGS. 16 through 18. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 2105 the UE 115 or base station 105 may transmit, using beamforming (e.g., analog beamforming) and a first port, a first signal corresponding to a symbol so as to cover a geographic sector. The operations of block 2105 may be performed according to the methods described with reference to FIGS. 1 through 15. In certain examples, aspects of the operations of block 2105 may be performed by a combined signal component as described with reference to FIGS. 16 through 18.

At block 2110 the UE 115 or base station 105 may transmit, using beamforming (e.g., analog beamforming) and a second port, a second signal corresponding to the symbol, wherein aspects of the symbol are additionally modulated during the transmitting of the second signal with respect to the transmitting of the first signal such that corresponding aspects of a combined signal of the first signal and second signal are beam-formed in one or more directions that at least partially overlap the geographic sector. The operations of block 2110 may be performed according to the methods described with reference to FIGS. 1 through 15. In certain examples, aspects of the operations of block 2110 may be performed by a combined signal component as described with reference to FIGS. 16 through 18.

At block 2115 the UE 115 or base station 105 may receive an indication from a receiver identifying one or more of the aspects of the combined signal, wherein the indication is based at least in part on measurements of the one or more of the aspects of the combined signal. The operations of block 2115 may be performed according to the methods described with reference to FIGS. 1 through 15. In certain examples, aspects of the operations of block 2115 may be performed by an indication component as described with reference to FIGS. 16 through 18.

At block 2120 the UE 115 or base station 105 may determine a refined beam for subsequent transmissions based at least in part on the indication. The operations of block 2120 may be performed according to the methods described with reference to FIGS. 1 through 15. In certain examples, aspects of the operations of block 2120 may be performed by an indication component as described with reference to FIGS. 16 through 18.

Figure 22:
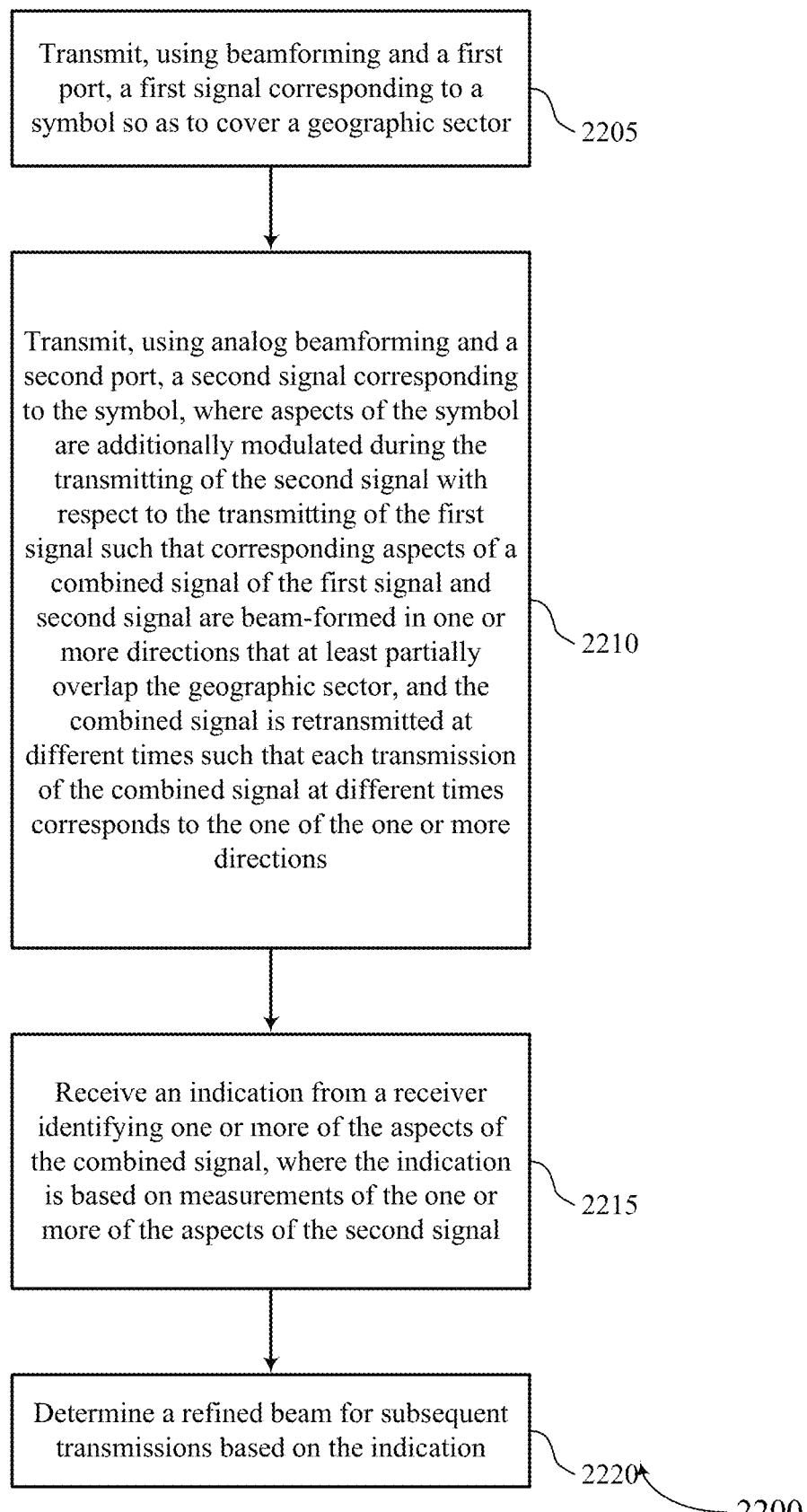

FIG. 22 shows a flowchart illustrating a method 2200 for beam refinement for mmW systems in accordance with aspects of the present disclosure. The operations of method 2200 may be implemented by a UE 115 or base station 105 or its components as described herein. For example, the operations of method 2200 may be performed by a communications manager as described with reference to FIGS. 16 through 18. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 2205 the UE 115 or base station 105 may transmit, using beamforming (e.g., analog beamforming) and a first port, a first signal corresponding to a symbol so as to cover a geographic sector. The operations of block 2205 may be performed according to the methods described with reference to FIGS. 1 through 15. In certain examples, aspects of the operations of block 2205 may be performed by a combined signal component as described with reference to FIGS. 16 through 18.

At block 2210 the UE 115 or base station 105 may transmit, using beamforming (e.g., analog beamforming) and a second port, a second signal corresponding to the symbol, wherein aspects of the symbol are additionally modulated during the transmitting of the second signal with respect to the transmitting of the first signal such that corresponding aspects of a combined signal of the first signal and second signal are beam-formed in one or more directions that at least partially overlap the geographic sector, and the combined signal is retransmitted at different times such that each transmission of the combined signal at different times corresponds to the one of the one or more directions. The operations of block 2210 may be performed according to the methods described with reference to FIGS. 1 through 15. In certain examples, aspects of the operations of block 2210 may be performed by a combined signal component as described with reference to FIGS. 16 through 18.

At block 2215 the UE 115 or base station 105 may receive an indication from a receiver identifying one or more of the aspects of the combined signal, wherein the indication is based at least in part on measurements of the one or more of the aspects of the second signal. The operations of block 2215 may be performed according to the methods described with reference to FIGS. 1 through 15. In certain examples, aspects of the operations of block 2215 may be performed by an indication component as described with reference to FIGS. 16 through 18.

At block 2220 the UE 115 or base station 105 may determine a refined beam for subsequent transmissions based at least in part on the indication. The operations of block 2220 may be performed according to the methods described with reference to FIGS. 1 through 15. In certain examples, aspects of the operations of block 2220 may be performed by a refined beam component as described with reference to FIGS. 16 through 18.

Figure 23:
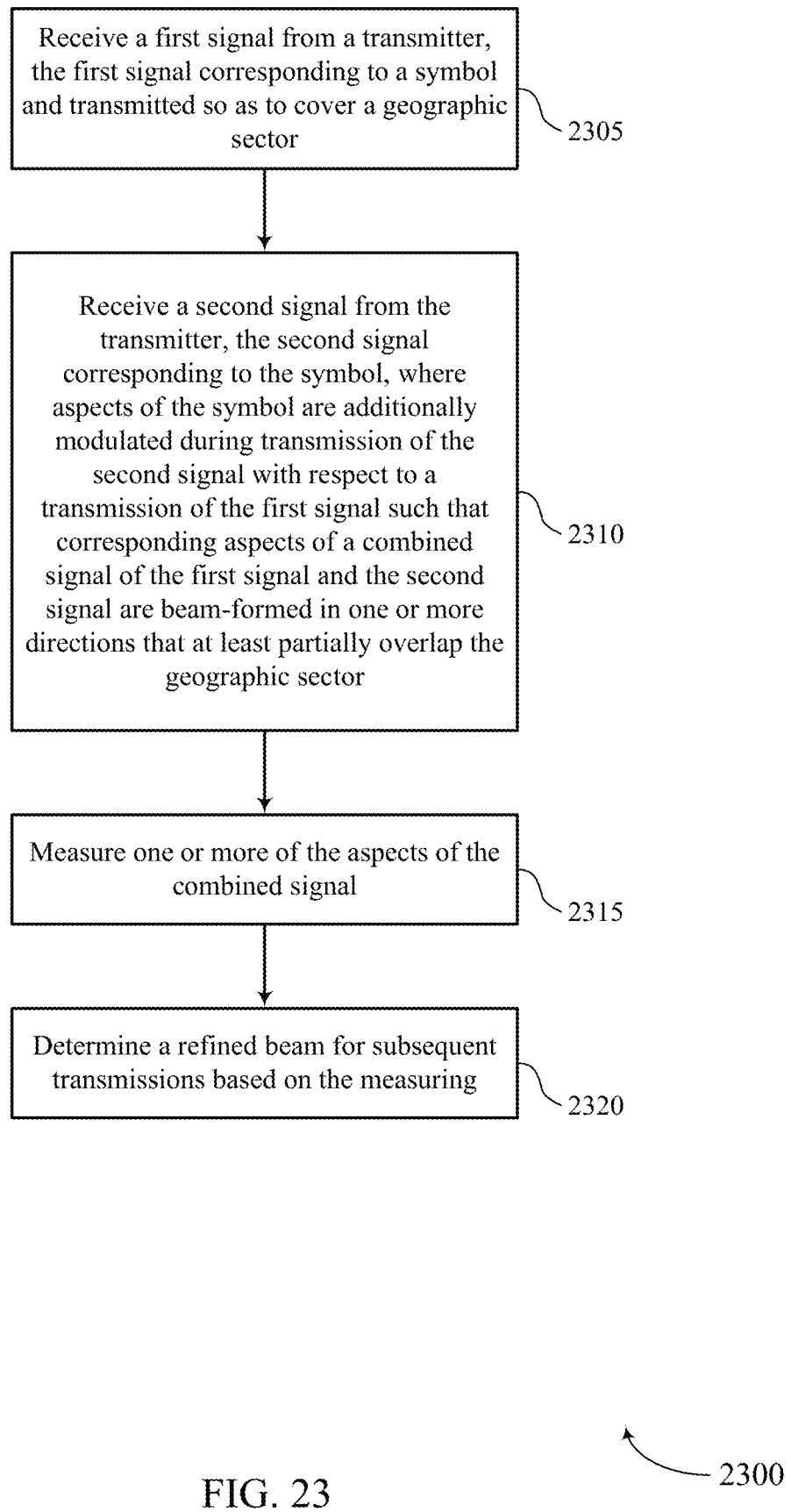

FIG. 23 shows a flowchart illustrating a method 2300 for beam refinement for mmW systems in accordance with aspects of the present disclosure. The operations of method 2300 may be implemented by a UE 115 or base station 105 or its components as described herein. For example, the operations of method 2300 may be performed by a communications manager as described with reference to FIGS. 16 through 18. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 2305 the UE 115 or base station 105 may receive a first signal from a transmitter, the first signal corresponding to a symbol and transmitted so as to cover a geographic sector. The operations of block 2305 may be performed according to the methods described with reference to FIGS. 1 through 15. In certain examples, aspects of the operations of block 2305 may be performed by a combined signal component as described with reference to FIGS. 16 through 18.

At block 2310 the UE 115 or base station 105 may receive a second signal from the transmitter, the second signal corresponding to the symbol, wherein aspects of the symbol are additionally modulated during transmission of the second signal with respect to a transmission of the first signal such that corresponding aspects of a combined signal of the first signal and the second signal are beam-formed in one or more directions that at least partially overlap the geographic sector. The operations of block 2310 may be performed according to the methods described with reference to FIGS. 1 through 15. In certain examples, aspects of the operations of block 2310 may be performed by a combined signal component as described with reference to FIGS. 16 through 18.

At block 2315 the UE 115 or base station 105 may measure one or more of the aspects of the combined signal. The operations of block 2315 may be performed according to the methods described with reference to FIGS. 1 through 15. In certain examples, aspects of the operations of block 2315 may be performed by a measuring component as described with reference to FIGS. 16 through 18.

At block 2320 the UE 115 or base station 105 may determine a refined beam for subsequent transmissions based at least in part on the measuring. The operations of block 2320 may be performed according to the methods described with reference to FIGS. 1 through 15. In certain examples, aspects of the operations of block 2320 may be performed by a refined beam component as described with reference to FIGS. 16 through 18.

Figure 24:
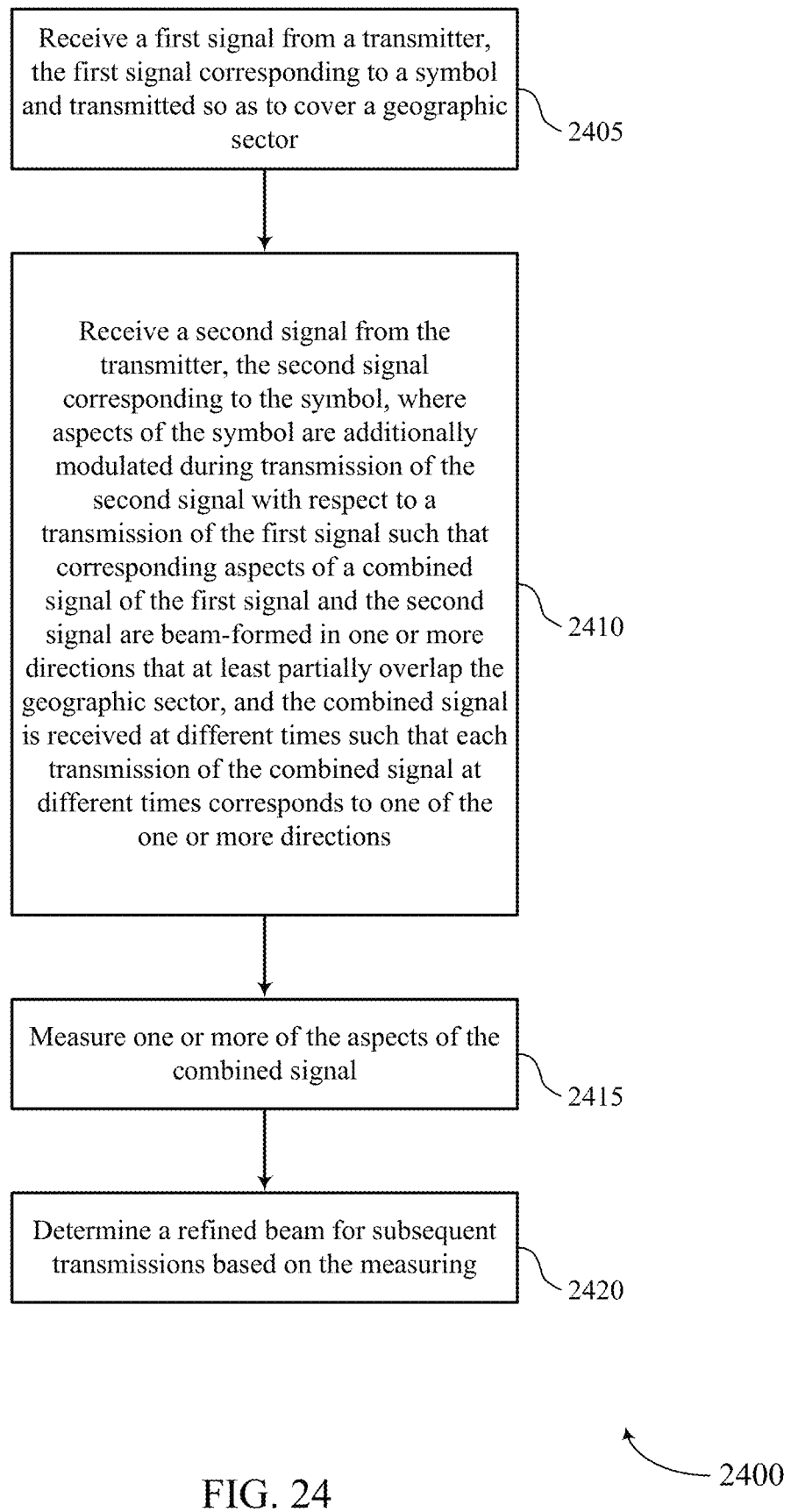

FIG. 24 shows a flowchart illustrating a method 2400 for beam refinement for mmW systems in accordance with aspects of the present disclosure. The operations of method 2400 may be implemented by a UE 115 or base station 105 or its components as described herein. For example, the operations of method 2400 may be performed by a communications manager as described with reference to FIGS. 16 through 18. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 2405 the UE 115 or base station 105 may receive a first signal from a transmitter, the first signal corresponding to a symbol and transmitted so as to cover a geographic sector. The operations of block 2405 may be performed according to the methods described with reference to FIGS. 1 through 15. In certain examples, aspects of the operations of block 2405 may be performed by a combined signal component as described with reference to FIGS. 16 through 18.

At block 2410 the UE 115 or base station 105 may receive a second signal from the transmitter, the second signal corresponding to the symbol, wherein aspects of the symbol are additionally modulated during transmission of the second signal with respect to a transmission of the first signal such that corresponding aspects of a combined signal of the first signal and the second signal are beam-formed in one or more directions that at least partially overlap the geographic sector, and the combined signal is received at different times such that each transmission of the combined signal at different times corresponds to one of the one or more directions. The operations of block 2410 may be performed according to the methods described with reference to FIGS. 1 through 15. In certain examples, aspects of the operations of block 2410 may be performed by a combined signal component as described with reference to FIGS. 16 through 18.

At block 2415 the UE 115 or base station 105 may measure one or more of the aspects of the combined signal. The operations of block 2415 may be performed according to the methods described with reference to FIGS. 1 through 15. In certain examples, aspects of the operations of block 2415 may be performed by a measuring component as described with reference to FIGS. 16 through 18.

At block 2420 the UE 115 or base station 105 may determine a refined beam for subsequent transmissions based at least in part on the measuring. The operations of block 2420 may be performed according to the methods described with reference to FIGS. 1 through 15. In certain examples, aspects of the operations of block 2420 may be performed by a refined beam component as described with reference to FIGS. 16 through 18.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), OFDMA, single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   transmitting, using beamforming and a first port, a first signal corresponding to a beam refinement symbol so as to cover a geographic sector;
   transmitting, using beamforming and a second port, a second signal corresponding to the beam refinement symbol, wherein aspects of the beam refinement symbol are additionally modulated during the transmitting of the second signal with respect to the transmitting of the first signal such that corresponding aspects of a combined signal of the first signal and second signal are beam-formed in one or more directions that at least partially overlap the geographic sector;
   receiving an indication from a receiver identifying one or more of the aspects of the combined signal, wherein the indication is based at least in part on measurements of the one or more of the aspects of the combined signal; and
   determining a refined beam for subsequent transmissions based at least in part on the indication.

2. The method of claim 1, wherein the beam refinement symbol is at least a portion of a reference symbol, at least a portion of a control symbol, or at least a portion of a data symbol.

3. The method of claim 1, further comprising:
   transmitting a reference combined signal corresponding to a first time instance that includes a reference modulation applied to the second signal transmitted by the second port, with respect to the first signal transmitted by the first port; and
   transmitting the combined signal corresponding to a second time instance, wherein aspects of the combined signal transmitted in the second time instance includes aspects that are beam-formed in one or more directions.

4. The method of claim, 3 wherein the indication is further based on measurements of the one or more of the aspects of the combined signal in reference to corresponding aspects of the reference combined signal.

5. The method of claim 4, wherein the aspects of the combined signal comprise a relative amplitude or a relative phase of a subset of tones of the combined signal.

6. The method of claim 1, further comprising:
   phase-modulating or amplitude modulating different tones of the second signal such that the combined signal includes a plurality of tone beams each corresponding to one of the one or more directions.

7. The method of claim 6, further comprising:
   grouping the tone beams into one of a frequency interleave or a block interleave so that more than one tone beam corresponds to one of the one or more directions.

8. The method of claim 6, further comprising:
   repeating transmission of the first and second signals resulting in a second combined signal, wherein aspects of the second combined signal are beam-formed in one or more directions that at least partially overlap with a second geographic sector;
   receiving a second indication from the receiver identifying one or more aspects of the second combined signal, wherein the second indication is based at least in part on measurements of the one or more of the aspects of the second combined signal; and
   determining a refined beam for subsequent transmissions based at least in part on the first indication and the second indication.

9. The method of claim 1, further comprising:
   transmitting, in additional signals, the beam refinement symbol via additional ports, the additional signals being modulated with respect to the first signal such that the additional signals are digitally beam-formed in additional directions that at least partially overlap the geographic sector.

10. The method of claim 1, further comprising:
    beam-forming the refined beam by rotating an analog-formed beam based at least in part on the indication, or by using digital or analog beam-forming, or a combination thereof, to increase a transmitted gain in a direction of the receiver.

11. The method of claim 1, wherein the indication comprises a direction to be used by the refined beam or a beam index corresponding to the direction to be used by the refined beam, or comprises the measurements of the gain of the combined signal.

12. The method of claim 1, further comprising:
    including a sector identification, a network identification, a panel identification, or combinations thereof, in one or both of the first signal and the second signal.

13. The method of claim 1, further comprising:
    transmitting the combined signal during a sector sweep phase; and
    receiving the indication as part of feedback received from the receiver.

14. The method of claim 1, further comprising:
    transmitting the combined signal in response to a request from the receiver for beam refinement.

15. The method of claim 1, wherein the combined signal is retransmitted at different times such that each transmission of the combined signal at different times corresponds to the one of the one or more directions.

16. A method for wireless communication, comprising:
receiving a first signal from a transmitter, the first signal corresponding to a beam refinement symbol and transmitted so as to cover a geographic sector;
receiving a second signal from the transmitter, the second signal corresponding to the beam refinement symbol, wherein aspects of the beam refinement symbol are additionally modulated during transmission of the second signal with respect to a transmission of the first signal such that corresponding aspects of a combined signal of the first signal and the second signal are beam-formed in one or more directions that at least partially overlap the geographic sector;
measuring one or more of the aspects of the combined signal; and
determining a refined beam for subsequent transmissions based at least in part on the measuring.

17. The method of claim 16, wherein the beam refinement symbol is a beam refinement symbol, at least a portion of a control symbol, or at least a portion of a data symbol.

18. The method of claim 16, further comprising:
receiving a reference combined signal corresponding to a first time instance that includes a reference modulation applied to the second signal transmitted by the second port, with respect to the first signal transmitted by the first port; and
receiving the combined signal corresponding to a second time instance, wherein aspects of the combined signal transmitted in the second time instance includes aspects that are beam-formed in one or more directions.

19. The method of claim 16, further comprising:
transmitting an indication of the refined beam to the transmitter.

20. The method of claim 19, wherein the indication is further based on measurements of the one or more of the aspects of the combined signal in reference to corresponding aspects of the reference signal.

21. The method of claim 16, wherein the first signal is in a first orthogonal frequency-division multiplexing (OFDM) symbol, and the second signal is in a second OFDM symbol, wherein the combined signal includes a plurality of tone beams each corresponding to one of the one or more directions.

22. The method of claim 16, further comprising:
measuring an aspect of the combined signal with reference to the reference combined signal comprises measuring a gain or a phase of the combined signal normalized by the gain of the reference combined signal.

23. The method of claim 16, further comprising:
receiving, from the transmitter, a repeated transmission of the first and second signals resulting in a second combined signal wherein aspects of the second combined signal are beam-formed in one or more directions that at least partially overlap with a second geographic sector;
measuring one or more of the aspects of the second combined signal with respect to a reference combined signal;
determining a different refined beam for subsequent transmissions based at least in part on the measuring; and
transmitting an indication identifying the different refined beam for subsequent transmissions.

24. The method of claim 16, further comprising:
transmitting an indication of the refined beam to the transmitter, wherein the indication comprises either a direction to be used by the refined beam or a beam index corresponding to the direction to be used by the refined beam.

25. The method of claim 16, further comprising:
identifying a sector identification, a network identification, a panel identification, or combinations thereof, in one or both of the first signal and the second signal.

26. The method of claim 16, further comprising:
receiving the combined signal during a sector sweep phase; and
transmitting an indication of the refined beam to the transmitter as part of a feedback message.

27. The method of claim 16, further comprising:
transmitting a request for beam refinement; and
receiving the first signal and the second signal in response to the request.

28. The method of claim 16, wherein the combined signal is received at different times such that each transmission of the combined signal at different times corresponds to one of the one or more directions.

29. An apparatus for wireless communication, comprising:
a processor;
memory in electronic communication with the processor; and
instructions stored in the memory and executable by the processor to cause the apparatus to:
transmit, using beamforming and a first port, a first signal corresponding to a beam refinement symbol so as to cover a geographic sector;
transmit, using beamforming and a second port, a second signal corresponding to the beam refinement symbol, wherein aspects of the beam refinement symbol are additionally modulated during the transmitting of the second signal with respect to the transmitting of the first signal such that corresponding aspects of a combined signal of the first signal and second signal are beam-formed in one or more directions that at least partially overlap the geographic sector;
receive an indication from a receiver identifying one or more of the aspects of the combined signal, wherein the indication is based at least in part on measurements of the one or more of the aspects of the second signal; and
determine a refined beam for subsequent transmissions based at least in part on the indication.

30. An apparatus for wireless communication, comprising:
a processor;
memory in electronic communication with the processor; and
instructions stored in the memory and executable by the processor to cause the apparatus to:
receive a first signal from a transmitter, the first signal corresponding to a beam refinement symbol and transmitted so as to cover a geographic sector;
receive a second signal from the transmitter, the second signal corresponding to the beam refinement symbol, wherein aspects of the beam refinement symbol are additionally modulated during transmission of the second signal with respect to a transmission of the first signal such that corresponding aspects of a combined signal of the first signal and the second signal are beam-formed in one or more directions that at least partially overlap the geographic sector;
measure one or more of the aspects of the combined signal; and
determine a refined beam for subsequent transmissions based at least in part on the measuring.

* * * * *